INVENTORS S. KANDEL
C. C. NIELSON
BY R. C. Winter
ATTORNEY

PART OF REGISTER 8

PART OF REPERTORY TRANSLATOR DISPATCHER 960

FIG. 15 PART OF REPERTORY ADMINISTRATOR 1030

PART OF REGISTER 8

United States Patent Office 3,415,954
Patented Dec. 10, 1968

3,415,954

TELEPHONE SYSTEM

Samuel Kandel, Columbus, and Carl C. Nielson, Granville, Ohio, assignors to Bell Telephone Laboratories, Incorporated, New York, N.Y., a corporation of New York Filed Jan. 21, 1965, Ser. No. 426,748
20 Claims. (Cl. 179—18)

ABSTRACT OF THE DISCLOSURE

A telephone switching system is arranged with common memory equipment accessible to a plurality of auxiliary line appearances each of which is associated with a privileged line and to which calling connections are terminated during the unvailable state of the privileged line. The memory equipment is responsive to each reception of a fixed code from a privileged line for causing the completion of a connection to each one of a plurality of lines as determined by information stored in the memory by each such line during a prior attempt to call the privileged line.

This invention relates generally to switching systems and particularly to telephone switching systems arranged to complete a communication path to any one of a large number of telephone stations in response to the reception of a predetermined directing code. More particularly, this invention relates to telephone systems which are arranged to complete a communication path between a telephone station generating a predetermined code and another station as determined by information priorly stored in a memory by the other station.

The improvement of telephone switching systems in recent years has permitted telephone stations at great distances from each other to be interconnected via a high quality communications path as a result of extremely simple manipulation of the calling station signaling apparatus. This simplicity of operation and high quality of voice transmission has, in turn, resulted in an ever increasing dependence upon the telephone as a substitute for other means of communication.

The amount of equipment which provides a voice communication path in response to each calling station's signals is carefully and constantly scrutinized by the local telephone company, so as to assure a high rate of call completion even during the busiest telephone hours of the day. However, most residential and business customers are provided with but a single telephone station which thus provides the sole link in telephone connections not subject to service improvement by the mere addition of parallel equipment.

A classic example of this problem is with respect to a physician's telephone station. Quite often the physician has established certain specified calling hours during which he welcomes incoming calls which may permit treatment of some patients without necessitating an office visit. Since the doctor alone can properly inform the calling party, all incoming calls are directed exclusively to the doctor. Obviously, since the calling station can properly accommodate but one conversation, all subsequent calls repeatedly receive a busy tone or similar signal to advise them that it will be necessary to again attempt completion of the calling connection. As a result, such repeated calling without completion is extremely inconvenient to the calling party. Further, it is economically disadvantageous to the local telephone company whose equipment is constantly utilized to complete connections without a charge being levied.

Arrangements have been provided in the past which permit a calling station to record its directory number for automatic establishment of a call-back connection between the calling and called parties when the called line becomes idle. Such an arrangement is disclosed in application Ser. No. 179,869, dated Mar. 15, 1962, by B. L. Hess. Although the Hess arrangement represents an improvement in the art, a need still exists for an arrangement which will permit a plurality of calling stations to record their respective directory numbers (or an alternative directory number) for subsequent call back at the discretion of the called party. A need also exists for an arrangement which will permit subsequent repeated call-back attempts if the original calling station should become busy or become unavailable in the interim. And a need exists for an arrangement which permits a calling station to record a directory number for subsequent call back by the called station independent of the reason for lack of call completion; i.e., line busy or failure to answer.

In view of the foregoing, an object of this invention is to provide a switching system arranged with automatic call-back facilities which are controllable optionally by each calling party in an exceedingly simple manner.

It is another object of this invention to provide a switching system arranged with automatic call-back facilities which do not require advance instructions to a calling party.

It is a further object of this invention to provide a switching system arranged with automatic call-back facilities wherein the called party may subsequently ignore, cancel, or activate such call-back facilities in an exceedingly simple manner.

These and other objects of the invention are attained in accordance with an exemplary embodiment in an automatic telephone system wherein common control circuits including centralized memory equipment are employed to control the establishment of calls through a switching network. The line appearance of each station provided with the call-back feature is equipped with auxiliary line equipment which is connectable to a calling line in response to the busy condition or no-answer condition of the privileged station.

Upon the completion of a calling connection to the auxiliary line equipment, a further connection is automatically established through the switching network to register apparatus operable to record the calling line directory number information in response to the generation of that information by the calling station. Upon the connection of the register equipment, an announcement source is enabled to thereby inform the connected calling party that he may dial a directory number to permit subsequent call back by the called station at a future time.

When the calling line directory number information is recorded in the register, a predetermined memory address location code is prefixed thereto, and this information is forwarded to associated common memory equipment where a write function is performed. Accordingly, the calling line directory number is written in the memory in a location broadly addressed by the line equipment location of the special service station and specifically addressed by the prefixed code. The calling station thereupon disconnects.

In similar fashion, assuming continued unavailability of the called station, a subsequent incoming call is connected through to the register equipment where once again a calling line directory number is registered. As before, the predetermined address code is prefixed and the memory equipment is seized. At this time, when the memory equipment receives the calling line directory numbers information, it is arranged to recognize the prior storage of information in the particular address location identified by the prefixed code and to automatically advance so as to cause the writing of this most recent information in the immediately succeeding address location.

When the called station desires to exercise the call-back function, the subscriber dials the first of a plurality of address codes assigned for this purpose. In response thereto the memory equipment is interrogated so as to read out the directory number information recorded at that specific address. Prior to releasing, the memory equipment is arranged to advance to a predetermined address location and to record therein the address location of the most recently interrogated address. The memory equipment thereupon forwards the directory number information to the register equipment which causes the completion of a connection to the party identified thereby. In response to an answer by this party, the auxiliary line equipment associated with the privileged station is signalled so as to cause the completion of a connection through to the register equipment. Upon the completion of this connection, the register equipment recognizes that an erase function has been signalled. Accordingly, the memory equipment is recalled and the predetermined address location containing the identity of the most recently interrogated address is selected. The information contained therein is read out and the memory advances, under control of the address information read out, to that address location to cause the erasure of the information priorly stored therein thereby rendering the most recently interrogated address location available for subsequent incoming calls which may occur during the period when the call-back function is being exercised by the privileged station. The above procedure is repeated at the discretion of the privileged station until all prior calling parties have been reached thereby restoring the memory equipment to its previous inactive state.

A feature of this invention is that a switching system is arranged to record a plurality of directory numbers in response to a respective plurality of unsuccessful calling connections.

Another feature of this invention is that a switching system is arranged to permit a privileged station to interrogate a memory so as to cause the completion of a connection to a priorly calling station in response to the dialing of a predetermined code by the privileged station.

Another feature of this invention is that a telephone system arranged to store the directory number information of a calling station is further arranged to provide automatic call back of the calling station at the discretion of the called party.

Another feature of this invention is that a telephone system arranged to store the directory number information of a calling station is further arranged to provide automatic call back of the calling station at the discretion of the called party and is further arranged to cause the automatic erasure of the calling line directory number information only in response to a subsequent successful calling connection to the priorly calling station.

Another feature of this invention is that automatic call-back equipment is provided operable to record a calling line directory number in response to either a busy line condition or a no-answer condition of a privileged station.

The foregoing objects and features of the present invention, as well as others, will be more apparent from the subsequent description of the exemplary embodiment shown in the drawing, in which.

It will be noted that FIGS. 2 through 18 employ a type of notation referred to as "Detached Contact" in which an "X," shown intersecting a conductor, represents a normally open "make" contact of a relay, and a "bar," shown intersecting a conductor at right angles, represents a normally closed "break" contact of a relay; "normally" referring to the unoperated condition of the relay. The principles of this type of notation are described in an article entitled, "An Improved Detached-Contact-Type of Schematic Circuit Drawing," by F. T. Meyer, in the September 1955 publication of American Institute of Electrical Engineers, Transactions, Communications and Electronics, vol. 74, pp. 505–313.

Figure 4:
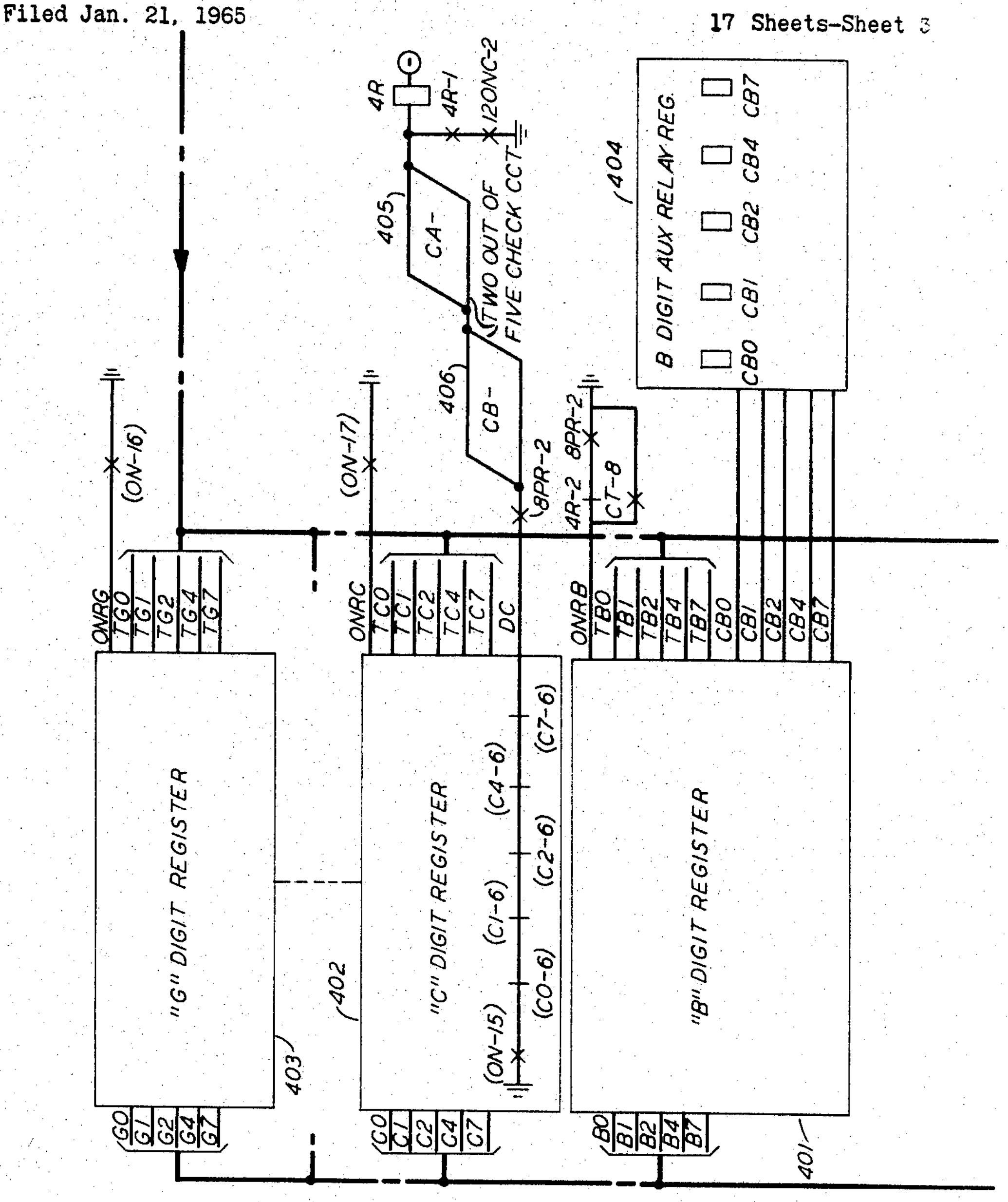
Figure 5:
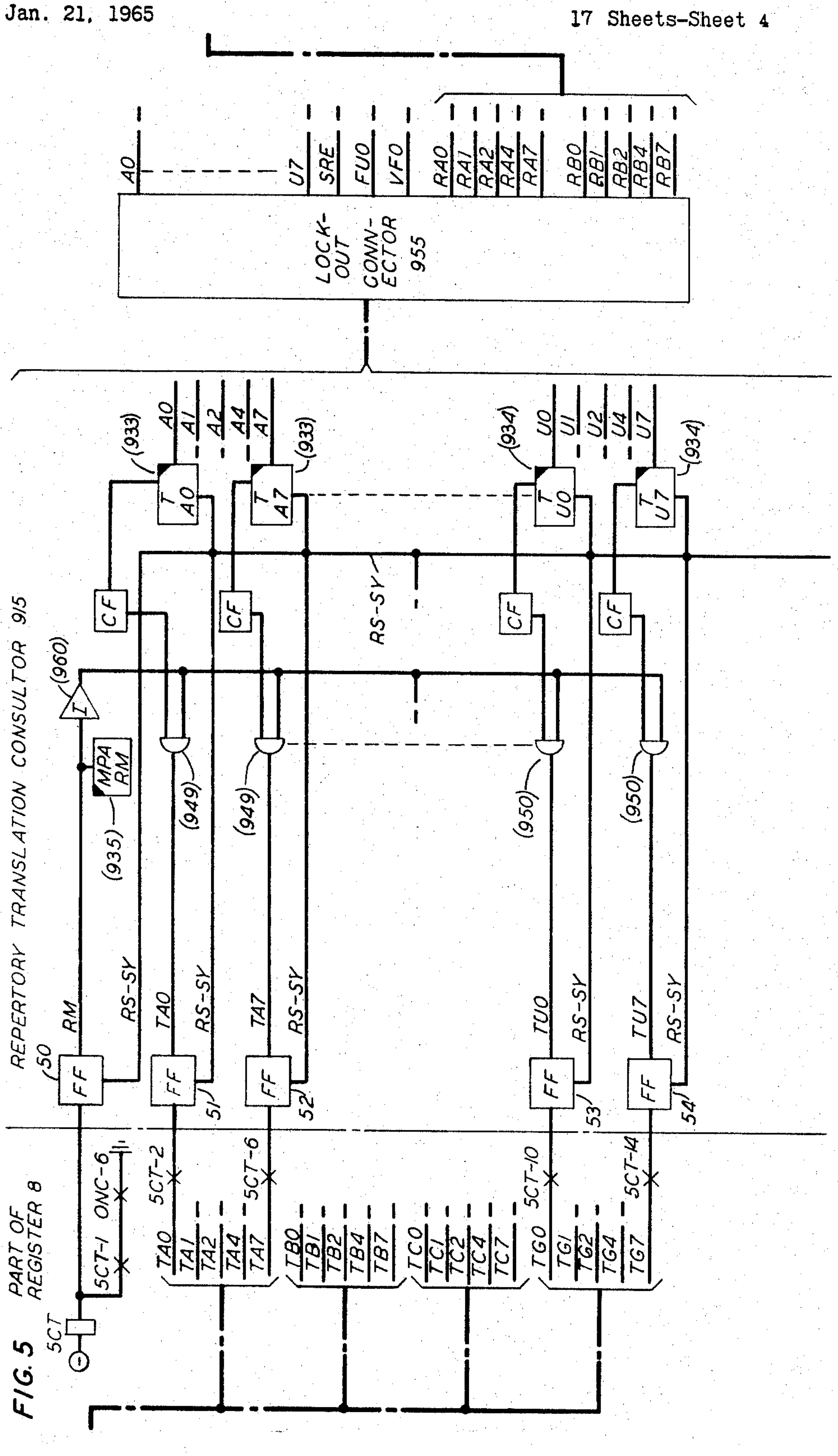

For the purpose of illustration as discussed in detail hereinafter, the various figures of the drawing employ apparatus disclosed in previously issued patents. In order to facilitate a clear understanding of the instant invention, such apparatus designations have been retained and are enclosed in parentheses in FIGS. 4–18 to facilitate cross reference with the patent from which they are derived. In the drawings, relay windings are designated by a one or two digit prefix which identifies the figure number on which the relay operate path is shown; i.e., relay 5CT (FIG. 5). In similar fashion each associated relay contact is designated by a one or two digit suffix which identifies the contact number; i.e., 5CT2 (contact 2 of relay 5CT).

The present invention is illustrated in an automatic telephone switching system which employs common control circuits including centralized memory equipment to control the establishment of calls through a switching network. One such system is the automatic switching system disclosed in the A. J. Busch Patent No. 2,585,904 issued Feb. 19, 1952 as modified by the addition of centralized memory equipment disclosed in the Malthaner-Vaughan Patent No. 2,951,908 issued Sept. 6, 1960.

Figure 1:
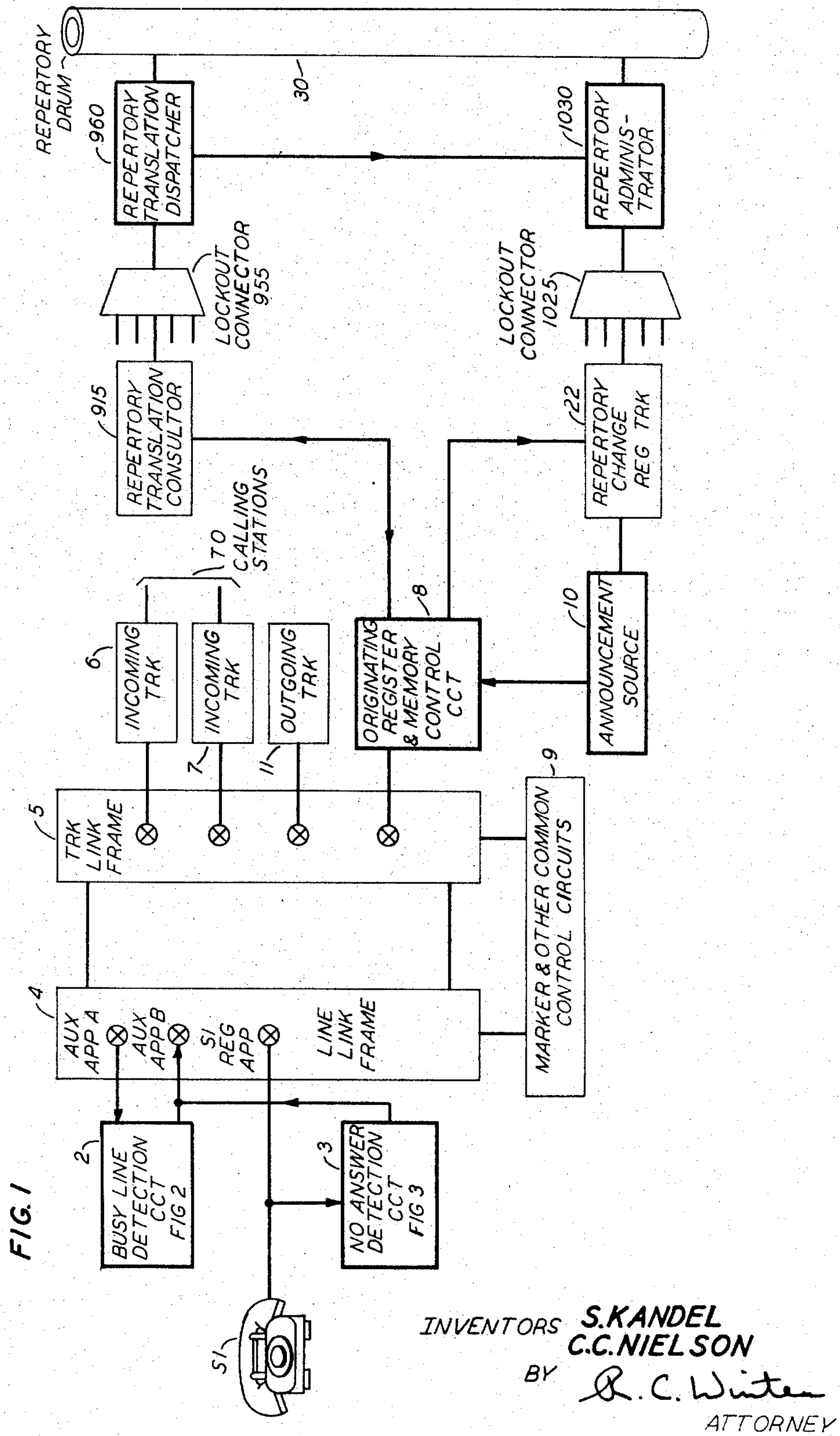
FIG. 1 is a block diagram showing the interrelation of the component elements of the exemplary embodiment.

The invention described herein is particularly concerned with apparatus in busy line detection circuit 2, no-answer detection circuit 3, originating register and memory control circuit 8, announcement source 10, repertory translation dispatcher 960, and repertory administrator 1030, which are represented by the blocks shown with heavy lines in FIG. 1 in order to distinguish them from prior art equipment units which are neither shown nor described in detail except where necessary for a complete understanding of the invention.

For purpose of illustration it is intended that the apparatus of line link frame 4, trunk link frame 5, incoming trunks 6 and 7, outgoing trunk 11, and marker & other common control circuits 9 be similar to apparatus disclosed in the aforesaid Busch patent; and that repertory translation consultor 915, lockout connector 955, repertory change register trunk 22, lockout connector 1025 and repertory drum 30 be similar to apparatus disclosed in the aforesaid Malthaner-Vaughan patent. For a more complete understanding of the construction and operation of these components the appropriate patent as hereinbefore set forth may be consulted.

*1. General description*

The interrelation and function of the equipment units of the exemplary embodiment will now be described with reference to FIG. 1 wherein the interconnections between circuit blocks have been designated by means of arrows to show the direction of circuit action. A station S1, which is provided with the call-back service, is shown connected to a regular appearance on line link frame 4. Incoming trunks 6 and 7, outgoing trunk 11, and originating register 8 are shown connected to trunk link frame 5. As is fully disclosed in the Busch patent, lines terminated on line link frames and trunks terminated on trunk link frames are interconnected, when active, by means of crossbar switches on these frames and by interframe junctors. All such connections are effected under control of a common group of circuits including marker and other common control circuits 9. Originating register 8 is shown interconnected between trunk link frame 5 of the Busch system and repertory translation consultor 915 and repertory change register trunk 22 of the Malthaner et al. system. As set forth in detail in the Malthaner et al. system, repertory change register trunk 22, lockout connector 1025, and repertory administrator 1030 are utilized to perform the write function in connection with the storage of directory number information in repertory drum 30, under control of signals generated by a subscriber station. As also described in the Malthaner et al. system, repertory change translation consultor 915, lockout connector 955 and repertory translation dispatcher 960 are utilized to perform the read function in response to the reception of a code generated by a subscriber station to thereby cause interrogation of directory number information priorly stored in repertory drum 30. As will be more apparent from that which is contained hereinafter, originating register 8 contains apparatus set forth in the Busch patent and further contains apparatus disclosed in the instant drawings operable to recognize and initiate a memory read function or memory write function as required for the particular connection in progress.

Referring momentarily to line link frame 4, it will be noted that the no-answer detection circuit 3 is associated with the station S1 regular appearance. As will be more apparent from the details contained in the following description, in response to the no-answer condition of station S1 auxiliary appearance B is enabled by no-answer detection circuit 3. In similar fashion it will be noted that busy-line detection circuit 2 is associated with auxiliary appearance A on line link frame 4. As will be explained subsequently, in the event that a connection is currently established to the S1 regular appearance, a subsequent incoming connection will be completed to auxiliary appearance A, in response to which busy-line detection circuit 2 causes the enabling of auxiliary appearance B.

From the immediately preceding description, it is obvious that auxiliary appearance B is enabled in response to a busy line condition of station S1 and also in response to a no-answer condition of station S1. The details of circuit operation as to busy-line detection circuit 2 and no-answer circuit 3 will be described in detail subsequently. For purpose of the general description, it will be sufficient to recognize that a connection completed via a trunk circuit, such as incoming trunk 6, will be connected to auxiliary appearance B through busy-line detection circuit 2 in the event of a busy condition of station S1, or will be connected via the S1 regular appearance through the no-answer detection circuit 3 to appearance B in the event of a no-answer condition of station S1.

In response to the enabling of auxiliary appearance B a dial tone connection bid is generated as set forth in the Busch patent. By virtue of the particular class of service assigned to auxiliary appearance B, marker circuit 9 recognizes that a specially modified register, such as originating register 8, should be connected to auxiliary appearance B at this time so as to enable the necessary memory equipment. Accordingly, upon connection to appearance B, originating register 8 enables repertory change register trunk 22 which thereupon returns a recorded announcement from announcement source 10 to auxiliary appearance B which, as will be more apparent hereinafter, is thus extended to the calling party. The announcement advises the calling station that he may dial his directory number (or any alternative directory number) so as to permit subsequent recall by the called station at a future time.

We shall assume that the calling station thereupon transmits this block of information. Accordingly, the calling line directory number information is recorded in repertory change register trunk 22 whereupon an address code, which for purpose of the embodiment comprises the digits 30, is automatically prefixed thereto. As will be more apparent subsequently, this address code identifies the particular slot in repertory drum 30 in which the directory number information is to be written at this time.

Upon completion of dialing, repertory administrator 1030 is selected via lockout connector 1025 by repertory change register trunk 22. As set forth in the Malthaner et al. patent, repertory administrator 1030 is arranged to locate a particular repertory area on drum 30 based upon the equipment location information of the privileged station. Within this broad address area, a plurality of particular address locations are located, each identified by a two digit code, such as the digit 30 in the instant case. Accordingly, at this time the calling line directory number information is recorded in repertory drum 30 in the area broadly addressed by the line equipment location of station S1 and specifically addressed by the slot designation 30. The associated memory equipment, register equipment, and linkage connection is thereupon released.

We shall assume at this time that prior to the exercise of the call-back feature by station S1, at least one subsequent incoming connection is completed through to auxiliary appearance B in identical fashion to that hereinbefore described. As before, a memory write function is initiated, an announcement is returned, and the digit 30 is prefixed to the calling line directory number information forwarded by the calling party. As will be more apparent from the detailed description, when repertory administrator 1030 begins the write function, it is arranged to recognize the prior recording of information in slot 30. Accordingly, the memory equipment advances and writes the newly received directly number information in the succeeding slot 31. The calling connection subsequently releases and the circuitry is restored to normal.

Deviating momentarily, for purpose of the embodiment we shall assume that the call-back area preassigned in repertory drum 30 for the recording of directory numbers comprises slots 30 through 38 in each equipment area assigned to privileged stations, such as station S1. We shall further assume that the subscriber at station S1 has been instructed that when it is desired to exercise the call-back function, the digit 1 should be dialed and then succeeded by the appropriate address code such as 30.

At this time, station S1 desires to exercise the call-back feature. Accordingly, upon the off-hook condition of station S1 a dial tone connection is completed through to register 8 as hereinbefore described. Register 8 recognizes from the prefixed digit one that a call-back read function is to be initiated. Accordingly, repertory translation consultor 915 is selected.

Upon the registration of the address code 30 in repertory translation consultor 915, repertory translation dispatcher 960 is selected via lockout connector 955. As set forth in detail in the Malthaner et al. patent, repertory drum 30 is thereupon enabled, slot 30 is interrogated, and the directory number information stored there is returned to register 8 via repertory translation consultor 915. In the instant embodiment, prior to releasing, repertory translation dispatcher 960 is arranged to select repertory administrator 1030 and to forward to that circuit the identity of the register slot most recently interrogated. Repertory administrator 1030 is arranged in response to the reception of this information to cause the memory to advance to another slot which in the instant arrangement is slot 39, and to record therein the identity of the slot from which directory number information has just been read by repertory translation dispatcher 960. The memory equipment thereupon releases.

When the directory number information read out of the memory is returned to originating register 8 as above described, marker circuit 9 is selected and a connection is completed to the station identified by the directory number as set forth in detail in the A. J. Busch patent. For purpose of the embodiment we shall assume that as a result of the information recorded in register 8 a connection is completed from the station S1 regular appearance to the called station via outgoing trunk 11 on trunk link frame 5.

As will be more apparent from the detailed description, in response to answer of the call by the called station the station S1 line equipment is arranged to signal the associated auxiliary appearance B. As a result of this signal a connection is completed from auxiliary appearance B to register 8 as hereinbefore described. At this time register 8 is arranged to recognize that an erase function is to be performed. Accordingly, repertory administrator 1030 is selected as described hereinbefore and begins the erase function by interrogating slot 39 in the are assigned to station S1. Accordingly, the digits 30 which identify the slot containing directory number information associated with the recently completed call-back connection is read out and registered in repertory administrator 1030. The memory equipment is arranged to advance at this time and to cause the information contained in the address location identified by the code 30 to be erased, so as to render that slot available for the writing of information in connection with calls which may attempt to complete to station S1 during the time that the call-back feature is being exercised.

It will be obvious from that which is contained hereinafter that in the event station S1 is unable to complete a connection through to the station identified by the information read out of the memory for any reason, such as an overflow condition or a no-answer condition, the directory number information will be retained in slot 30 in the repertory drum for subsequent use.

Upon the completion of the aforedescribed call-back connection, station S1 may continue to exercise the call-back feature by dialing address codes 31, 32, et seq., until a connection has been completed to all priorly calling stations. As will also be more apparent from that which is contained hereinafter, station S1 may also ignore the exercise of the call-back feature until any arbitrarily selected time in the future or may generate an erase code to cause the erasure of information contained in any specific memory slot.

2. *Detailed description*

It will be noted from the immediately preceding general description that considerable circuit detail information is disclosed in the earlier cited Busch and Malthaner et al. patents which are hereby made a part of this specification as though contained in detail herein. Accordingly, this information will not be repeated. In the following paragraphs, various circuit blocks of the invention as shown on FIG. 1 will be described only where detailed information such as above recited is not found in the prior art.

2.01 *Operation of busy-line detection circuit 2*

Referring to FIG. 1, as hereinbefore described in the event that the S1 regular appearance is busy, a connection is automatically completed to the associated auxiliary appearance A. The automatic completion of a calling connection to an alternative line appearance upon the busy condition of a called line appearance may be accomplished by employing any one of numerous arrangements well known in the art; for example, by employing the arrangement shown in Patent No. 2,706,749 dated Apr. 19, 1955 and issued to M. E. Krom.

Figures 2, 3:
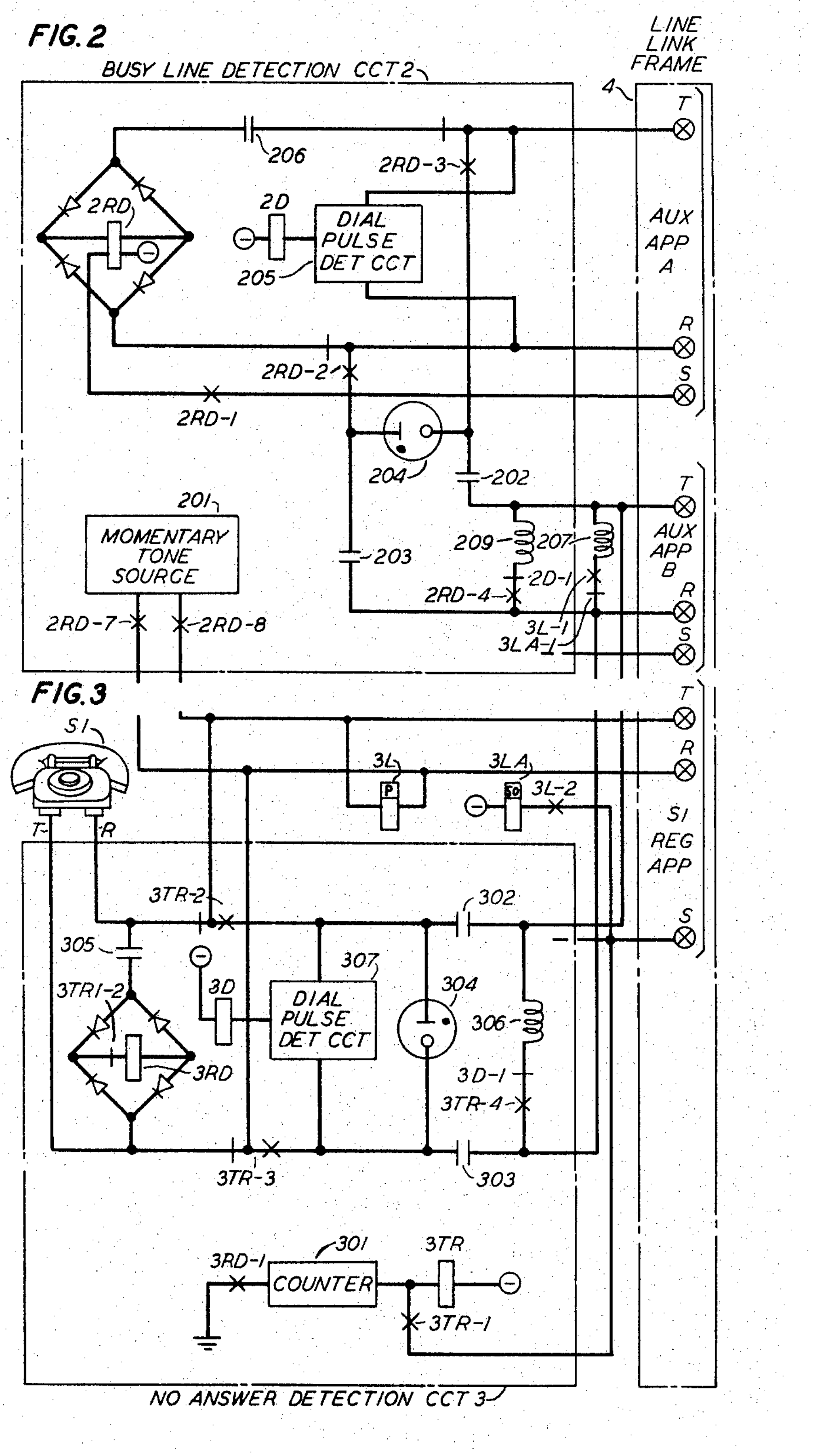
FIGS. 2 through 18 are diagrams in schematic form showing in greater detail the interrelation of the components of the exemplary embodiment.

Continuing now with the description and referring to FIG. 2, upon the completion of a calling connection to the T and R conductors of auxiliary appearance A on line link frame 4 as set forth in detail in the Busch patent, ringing is appplied to these conductors, in response to which ringing detection relay 2RD operates by an obvious circuit. The enabling of make contact 2RD–1 completes a holding path for this relay which extends through the lower winding of the 2RD relay to ground which is provided on the S lead as set forth in the Busch patent. The enabling of make contacts 2RD–2 and 2RD–3 thereupon inserts gas tube 204 across the T and R conductors. Gas tube 204 appears as a momentary D.-C. shunt sufficient to trip ringing in the well known fashion. The enabling of make contacts 2RD–7 and 2RD–8 impresses a momentary source of tone from momentary tone source 201 across the T and R conductors of the station S1 regular appearance and thus to station S1 thereby informing station S1 that an attempt has been made to complete a connection to station S1 at this time.

The enabling of make contact 2RD–4 inserts coil 209 as a bridge across the T and R conductors of auxiliary appearance B. The insertion of this bridge causes the completion of a dial tone connection to register 8 as set forth in detail in the Busch patent. Upon the completion of this connection, a voice path extends between auxiliary appearance B and auxiliary appearance A via capacitors 202 and 203, and enabled make contacts 2RD–2 and 2RD–3 in busy line detection circuit 2.

It will be further noted that dial pulse detection circuit 205 is inserted across the T and R conductor of auxiliary appearance A. Dial pulse detection circuit 205, which may comprise a number of configurations well known in the art, is arranged to control relay 2D to thereby repeat any subsequently generated dial pulses across the T and R conductors of auxiliary appearance B by means of the operation and release of break contact 2D–1. It is of course obvious that dial pulse detection circuit 205 is not required where calling stations are equipped with AC signaling means.

2.02 *Operation of no-answer detection circuit 3*

Referring now to FIG. 1, as discussed generally hereinbefore, no-answer detection circuit 3 detects the no-answer condition of station S1 in response to the completion of a connection to the S1 regular appearance.

Referring now to FIG. 3, upon the completion of a calling connection to the S1 regular appearance, ringing potential is applied to the T and R conductors as hereinbefore set forth, and thus through capacitor 305 to a bridge network so as to operate relay 3RD. The operation of make contact 3RD–1 provides an input signal to counter circuit 301 at this time.

Counter circuit 301 may comprise a number of configurations well known in the art such that in response to a predetermined number of input signals within a predetermined time interval a ground signal is provided as an output. Accordingly, if station S1 does not answer within a prescribed number of applications of ringing voltage, relay 3TR operates. The operation of contacts 3TR–2 and 3TR–3 transfers the T and R leads of the S1 regular appearance through to gas tube 304 so as to trip ringing at this time in the well-known fashion. The enabling of make contact 3TR–4 inserts coil 306 across the T and R conductors of auxiliary appearance B in similar fashion to that hereinbefore described for the operation of busy-line detection circuit 2. In similar fashion to that described for busy-line detection circuit 2, dial pulse detection circuit 307 is inserted across the T and R conductors of the S1 regular appearance to permit control of relay 3D which, in turn, repeats dial pulses to auxiliary appearance B via the operated and released state of the 3D–1 break contact.

2.03 *Memory write function*

We shall assume that a calling line has been connected through to auxiliary appearance B on line link frame 4 because of the unavailability of station S1 to the calling station at this time. This may have occurred by virtue of the enabling of busy-line detection circuit 2 as described hereinbefore, or because of the enabling of no-answer detection circuit 3 as described hereinbefore. In either event, as described in preceding sections, a dial tone bid is generated from auxiliary appearance B.

As set forth in detail in the Busch patent, each line appearance is assigned a specific class of service which indicates to the marker circuit the type of treatment which the line is to receive. In the instant arrangement marker circuit 9 (FIG. 1) recognizes from the class of service of auxiliary appearance B that a dial tone connection should be established to a register such as originating register 8.

Figure 12:
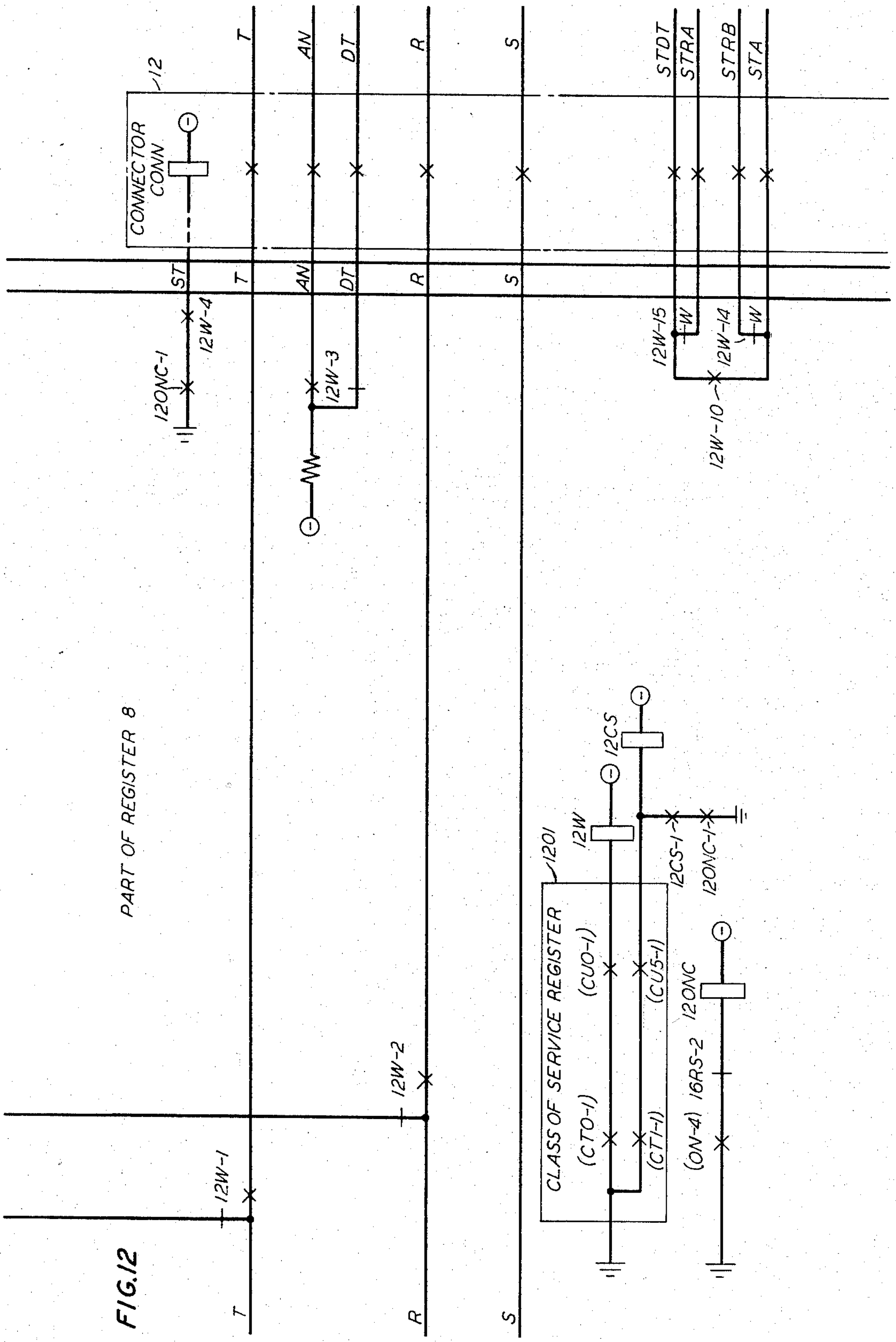

Referring now to FIG. 12, for purpose of the embodiment we shall assume that auxiliary appearance B has been assigned class of service 00. Accordingly, upon the connection of originating register 8 through to auxiliary appearance B, make contacts CTO–1 and CUO–1 in class of service register 1201 are enabled in register 8 to thereby complete the obvious operate path of relay 12W. Relay 120NC also operates at this time through enabled make contact ON–4 which, as set forth in the Busch patent, is enabled in response to the off normal condition of register 8. Ground is thereby extended by the ST lead through enabled make contacts 120NC–1 and 12W–4 to connector circuit 12 so as to operate the CONN relay. Connector circuit 12 may comprise a number of configurations well known in the art operable to simultaneously interconnect two circuits to the exclusion of other circuits at this time.

Figure 13:
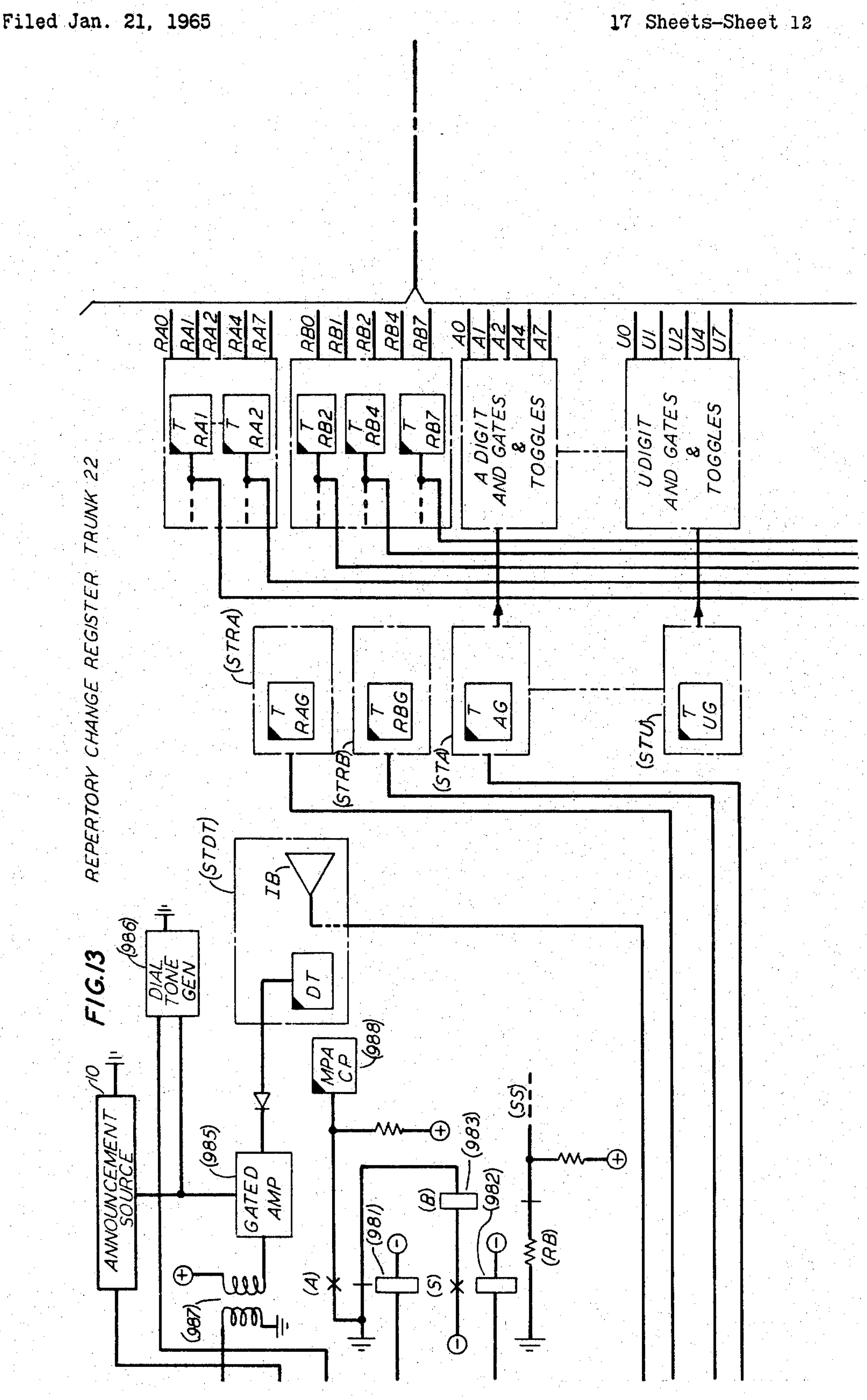

The enabling of the CONN relay closes a plurality of leads between register circuit 8 (FIG. 12) and repertory change register trunk 22 (FIG. 13). The enabling of transfer contacts 12W–1 and 12W–2 extend the T and R conductors from auxiliary appearance B through originating register 8, via connector 12, to the correspondingly designated leads in repertory change register trunk 22.

As disclosed in detail in the Malthaner patent, repertory change register trunk 22 detects and accumulates the digits dialed by a connected line; and dispatches the line equipment information of the connected line, an address code, and the dialed directory number to be associated therewith to repertory administrator 1030 (FIG. 1).

When the T and R leads from auxiliary appearance B are extended via make contacts 12W–1 and 12W–2 from auxiliary appearance B through register 8 to repertory change register trunk 22, relay 981 therein will operate over the loop through the aforedescribed bridge present at auxiliary appearance B. With DT toggle normal in repertory change register trunk 22 a negative signal voltage is applied through a diode to gated amplifier 985 as discussed in detail in the Malthaner et al. patent. In the instant arrangement the enabled condition of make contact 12W–3 extends negative battery on the AN lead from register 8 (FIG. 12) through connector circuit 12 to enable announcement source 10. Announcement source 10 may comprise a number of configurations well known in the art operable to provide a repeated audible announcement stating in effect "The number you have called is not available at this time. If you wish your call returned, please dial your directory number."

The aforedescribed enabling of gated amplifier 985 forwards the output of announcement source 10 through the primary winding of transformer 987 to the connected line. The calling customer is thus alerted that he may dial a directory number at this time or may abandon the connection.

Assuming the connection is abandoned at this time, relay ON releases in register 8 as set forth in the Busch patent and the circuitry returns to normal. However, for purpose of the embodiment, we shall assume that the calling customer maintains the existing connection and prepares to dial the directory number of the calling station. It may be noted that any directory number may, in fact, be dialed at this time.

Relay 982 in repertory change register trunk 22 operates from ground present on the S lead of the customer's line. The operation of relay 982 provides negative battery to one side of the winding of relay 983 which does not operate at this time because of the previous operation of relay 981 as set forth in the Malthaner et al. disclosure.

When relay 2D or relay 3D operates in response to the first break of the calling customer's dial contacts, relay 981 releases and in releasing operates relay 983. As disclosed in detail in the Malthaner et al. patent, each release of relay 981 generates a negative signal voltage to the input of CP monopulser 988, thereby forwarding this information to the dial pulse accumulator circuit. As further disclosed in the Malthaner et al. patent, the operation of relay 983 causes the disabling of gated amplifier 985 thus removing the announcement from the connection extending to the calling station.

Relay 981 will release on each line opening produced by a dial pulse and will reoperate on each closure. Relay 983 is a slow release relay and will remain operated during each train of dial pulses representing each digit dialed by the customer, and will release only in the interdigital interval. As disclosed in detail in the Malthaner et al. patent, the signal voltage applied to the SS lead via the break contact of relay 983 controls the operation of the successive stages of the steering circuit, so that the digits dialed by the calling customer are registered in their respective groups of register toggles.

In the instant embodiment the output of circuit block STDT, which is normally provided as an input to enable steering circuit STRA, is forwarded by enabled make contact 12W–10 so as to enable steering circuit STA. It will thus be obvious that the digits dialed by the calling party will be recorded in the A through U digit AND gates and toggles as set forth in detail in the Malthaner patent.

Figure 16:
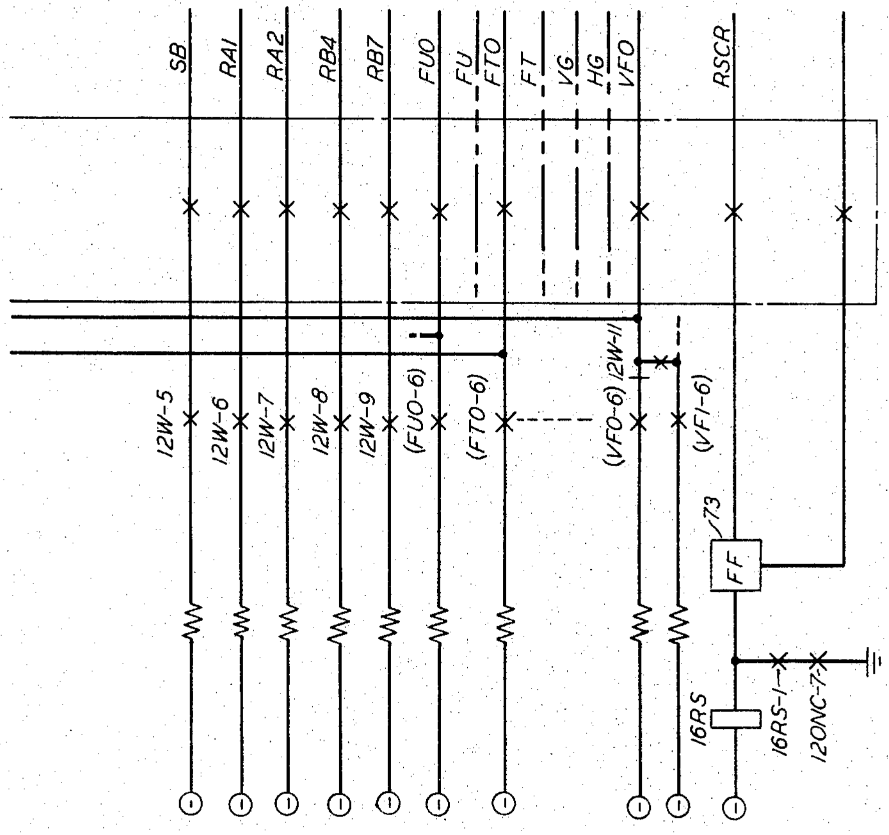
Figure 19:
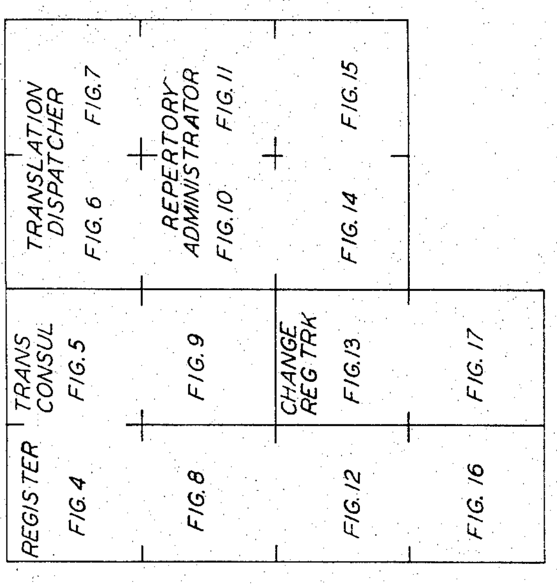
FIG. 19 is a key chart depicting the position in which the various figures should be placed.

Concurrently with the selection of repertory change register trunk 22, negative potential is extended through enabled make contacts 12W–6 and 12W–7 from FIG. 16 through connector circuit 12 and via the RA1 and RA2 leads, respectively, to enable correspondingly designated toggles in repertory change register trunk 22. In similar fashion enabled make contacts 12W–8 and 12W–9 (FIG. 16) cause the enabling of toggles RB4 and RB7 in repertory change register trunk 22 (FIG. 13). As will be more apparent from that which is contained hereinafter, the enabling of toggles RA1, RA2, RB4, RB7 provide the address location 30 which will subsequently be used to determine the particular slot in repertory drum 30 in which the calling line directory number will be written.

As set forth in detail in the Malthaner patent, the broad area in the memory which is assigned to a special service station is identified by the line equipment location information of that station. It is obvious, of course, that auxiliary appearance B is manifested by a line location equipment which differs from station S1. However, numerous techniques well known in the art may be employed to provide to the memory equipment an indication of the line equipment location of station S1; for example, each auxiliary appearance may be arranged to differ only in the vertical file location. Thus, for example, although auxiliary appearance B appears in vertical file 1 as manifested by the enabled condition of make contact (VF1–6) (FIG. 16), the operated state of make contact 12W–11 is advantageously arranged to extend an identification potential over the lead associated with vertical file O thus providing information which identifies the line equipment location of station S1 to the memory, rather than the actual location of auxiliary appearance B. As shown on FIG. 16 the remaining line identification relays are enabled such as FU0–6 and FT0–6 so as to prepare for the enabling of the correspondingly designated toggles in repertory change register trunk 22 at this time.

Figure 17:
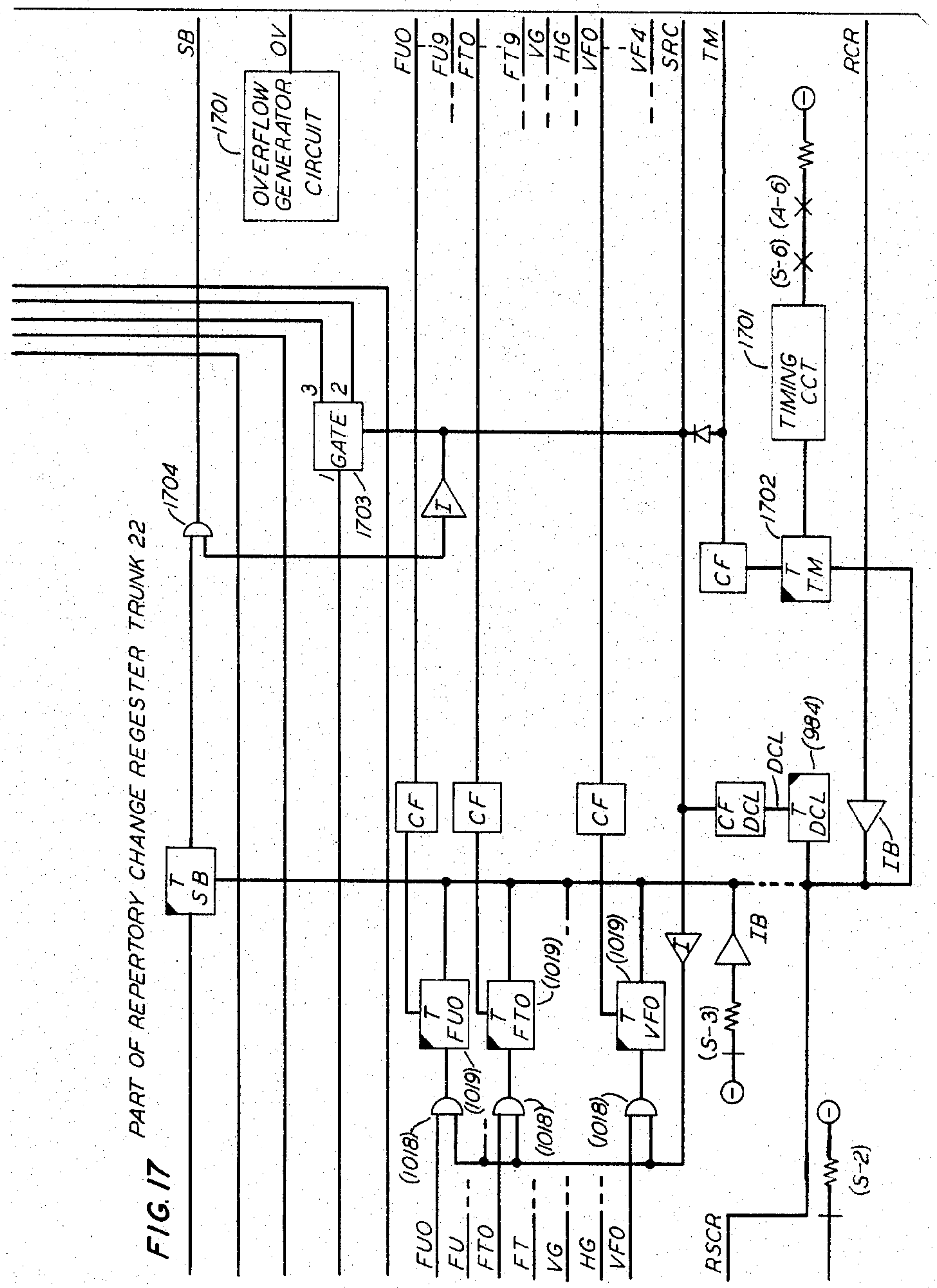

As disclosed in detail in the Malthaner et al. patent, the completion of dialing is indicated by the operation of DCL toggle 984 shown in FIG. 17, thereby providing a positive signal potential on lead DCL. This positive signal potential is applied through an inverter so as to place a negative signal potential on one input of each of the AND gates 1018. As set forth in the Busch patent, the customer line equipment identification is manifested by operated FT-, FU-, VG-, HG-, and VF- relays in originating register 8. Therefore, the line identification leads such as FU0, FT0, and VF0 (typical) having negative battery potential thereon by virtue of operated make contacts such as FU0–6, FT0–6, and VF1–6 are completed by operated contacts on relay 12W to enable the associated AND gates 1018. The corresponding toggles 1019 are thus operated, thereby providing the proper signal potentials on the correspondingly designated line identification leads to lockout connector 1025.

The positive signal potential on lead DCL is also applied directly to the SRC lead to lockout connector 1025, so that a start signal is passed to repertory administrator 1030 along with the line equipment signal voltages, the signal voltages for the repertory code, and also the dialed directory number as set forth in detail in the Malthaner et al. disclosure.

Figure 18:
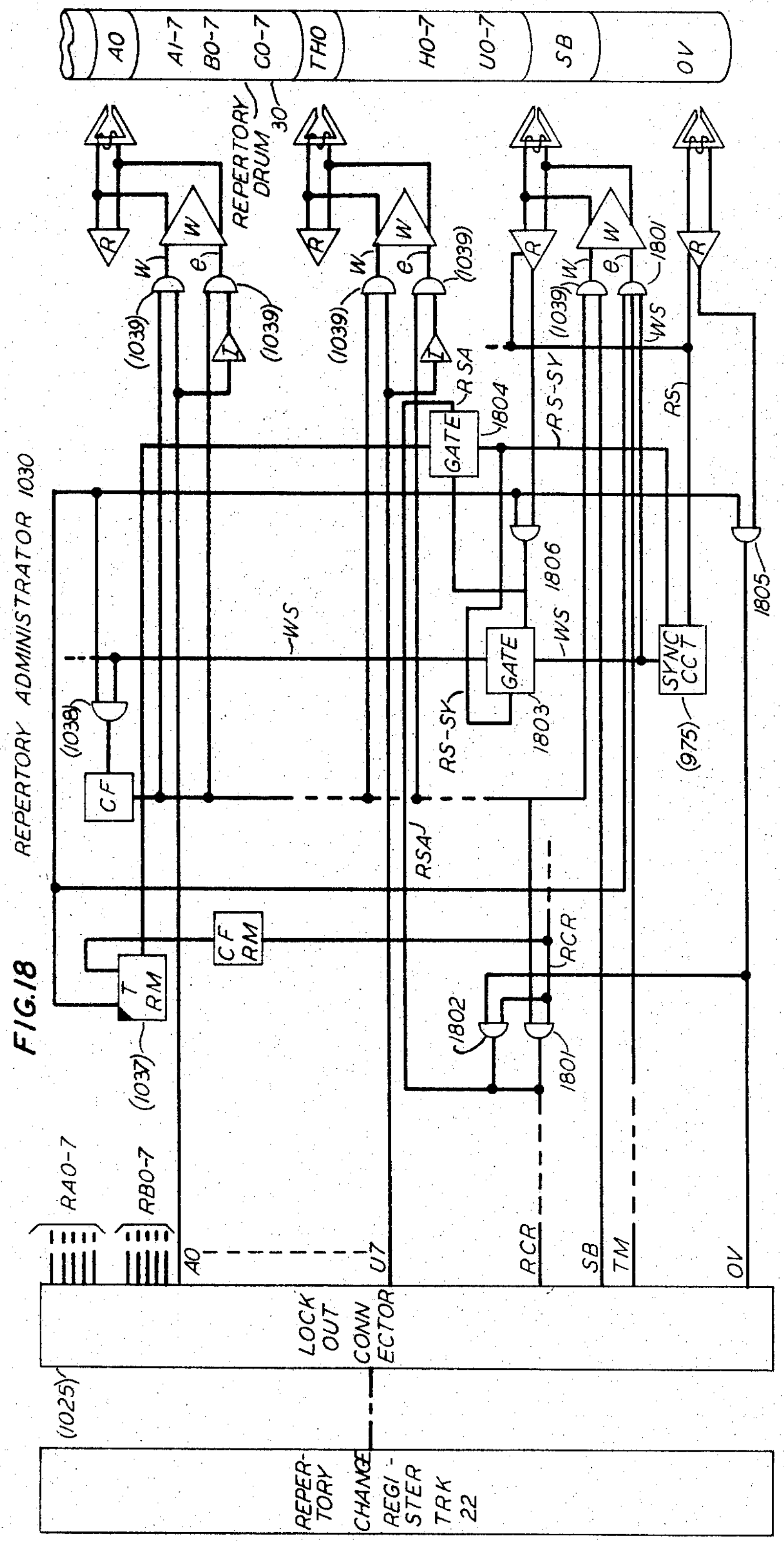

Referring now to FIG. 18, as described hereinbefore, the information recorded in repertory change register trunk 22 is forwarded to repertory administrator 1030; the function of this latter circuit being the writing of information in repertory drum 30. As described in detail in the Malthaner et al. patent, repertory administrator 1030 utilizes the line equipment location information to locate the area on repertory drum 30 in which directory number information may be stored. As further set forth in the Malthaner patent, the prefixed two digit address code is utilized by repertory administrator 1030 to determine the particular slot in repertory drum 30 in which the directory number information should be recorded.

Accordingly, as set forth in the Malthaner patent, when slot 30 has been located within the area assigned to station S1, RM toggle 1037 is enabled. As shown in FIG. 18, the output of toggle 1037 is applied as an input to the upper terminal of AND gate 1038. Upon the subsequent occurrence of a write sync pulse on the WS lead to the lower input of AND gate 1038 the associated cathode follower CF is enabled. Gate 1803, which may comprise a number of configurations well known in the art, is serially inserted in the instant embodiment between sync circuit 975 and the lower input terminal of AND gate 1038. As will be more apparent hereinafter, gate 1803 is normally closed. Thus, upon the occurrence of a pulse on the WS lead from sync circuit 975, AND gate 1038 is enabled thereby providing an input signal to the upper terminals of AND gates 1039 associated with each of the writing amplifiers. It is obvious that for the writing amplifier to be enabled as set forth in Malthaner, it is but necessary to have a concurring input signal on the lower terminals of each of AND gates 1039 at this time.

Accordingly, as hereinbefore described, the enabling of RM toggle 1037 indicates that the specific address location of repertory drum 30 has been located and thus the potentials present on the directory number indicating leads AO through UO7 and the SB class of call indicating lead are operative to enable the respective AND gates 1039 to thereby cause a mark to be written in the respectively associated cells in slot 30 at this time.

As set forth in the Malthaner patent, the output of RM toggle 1037 is applied to the RCR lead through lockout connector 1025 to repertory change register trunk 22 to restore those circuits to normal. In the instant arrangement for reasons which will be obvious subsequently, lead RCR has inserted serially therein an AND gate 1801 which provides an output responsive only to the enabling of RM toggle 1037 in concurrence with an input signal manifested by the enabling of AND gate 1038. Thus, at this time AND gate 1801 is enabled, and a signal is forwarded via the RCR lead to inverter IB in FIG. 17 so as to restore the priorly operated toggles in repertory change register trunk 22 to normal as set forth in the Malthaner patent. In addition thereto as shown in FIG. 17, this signal is applied via the RSCR lead to flip-flop 73 in register circuit 8 so as to cause the operation of relay 16RS at this time. The enabling of break contact 16RS–2 restores relay 120NC to normal thereby releasing the priorly operated apparatus in register 8.

2.04 *Enabling of the memory write function by subsequent calling stations prior to exercise of the call-back feature by station S1*

We shall assume at this time that a subsequent incoming call attempts to complete to station S1 and is unable to do so because of a busy condition or a no-answer condition of station S1 as hereinbefore described. We shall further assume that such incoming call occurs at a point in time after the registration of directory number information by a prior calling station, and also prior to the enabling of the call-back feature by station S1.

Proceeding now with the description, upon the re-enabling of auxiliary appearance B on line link frame 3 (FIG. 1), circuit action proceeds identically as set forth in the immediately preceding section. Thus, repertory administrator 1030 (FIG. 18) is selected. Address location code 30 and the calling line directory number information is forwarded to that circuit. As hereinbefore described, repertory administrator 1030 locates the area on repertory drum 30 assigned to station S1 and specifically locates slot 30 within that area thereby enabling RM toggle 1037 (FIG. 18).

Summarizing momentarily, as hereinbefore described, the directory number information associated with the immediately preceding calling party is currently registered in repertory drum slot 30. Therefore, the following description will describe the circuit operation whereby the subsequently received information is recorded in a succeeding slot in repertory drum 30.

Proceeding now with the description, as described earlier, when the information associated with the preceding calling station was written in repertory drum 30, a mark was concurrently written in the SB channel of that slot to provide an indication that the slot currently contains information for use in connection with the call-back feature. Thus, at this time the output of RM toggle 1037 provides an input to the upper terminal of AND gate 1806. As set forth in detail in the Malthaner patent, a pulse occurs on the RS (read sync) lead from sync circuit 975 at a point in time immediately preceding the generation of a write sync pulse. Thus, since the SB cell in slot 30 has a mark written therein, the read amplifier associated therewith will provide an output in response to the enabling of the RS lead. This output is provided to the lower input of AND gate 1806 which, in turn, enables inhibiting gate 1803 to prevent the transmission of a write sync pulse to the lower input terminal of AND gate 1038. In similar fashion inhibiting gate 1804 is enabled and prevents the transmission of a reset pulse on the RS-SY lead to RM toggle 1037 at this time.

Thus, information is not written in slot 30 at this time. As the drum continues to rotate beyond this cell interval, a pulse is provided on the RS-SY lead as set forth in the Malthaner patent. As shown on FIG. 18, the RS-SY lead is extended to inhibiting gate 1803 to thereby restore this gate to normal. Since we have assumed that succeeding slot 31 has not been priorly utilized, when the reading heads are directly over this slot, the absence of a mark in the SB channel in that slot will permit gate 1803 to remain in its normal condition. Accordingly, the subsequent provision of a write sync pulse on lead WS enables AND gate 1038 thereby permitting the enabling of the writing amplifiers associated with activated directory number information leads from repertory change register trunk 22 as hereinbefore described. As further described in detail hereinbefore, a signal is thereupon provided via the RCR lead to repertory change register trunk 22 to restore the associated circuitry to normal.

2.05 *Overflow condition*

We shall assume that a plurality of incoming calls have been served as set forth in the immediately preceding section thereby using all address locations priorly assigned to station S1 for this purpose. This section will describe the manner in which an overflow signal is returned in response to an attempt by an additional calling party to record information in the memory.

Referring now to FIG. 18, we shall assume that circuit operation proceeds exactly as set forth in the immediately preceding section. Thus as a result of the presence of a mark in the SB channels 30 through 39 (the mark in slot 39 being permanent), repertory drum 30 rotates to the point where the reading heads are located directly over slot 40. The lower channel on repertory drum 30 is advantageously assigned for overflow purposes. Accordingly, in each slot marking the end of an area preassigned for the call-back feature, a permanent mark is provided in this slot. Thus, when the reading heads are located directly over this particular cell in slot 40, upon the occurrence of a read sync pulse on lead RS, the associated read amplifier is enabled and thus provides an input to the lower terminal of AND gate 1805. A concurring signal on the upper terminal of AND gate 1805 from enabled RM toggle 1037 provides an output signal on lead OV through lockout connector 1025 to repertory change register trunk 22. As shown on FIG. 17, overflow generator circuit 1701 is thus enabled. Overflow generator circuit 1701 symbolizes any one of a plurality of circuits well known in the art operable to return an overflow signal to a connected station.

It will also be noted that the output of AND gate 1805 is provided as an input to the upper terminal of AND gate 1802 which in conjunction with a concurring signal on the RCR lead from RM toggle 1037, as hereinbefore described, provides an output on the RCR lead to restore the connecting circuits to normal, and also to thereby restore inhibiting gate 1804 (FIG. 18) to normal so that a subsequent signal on the RS-SY lead will be extended so as to reset RM toggle 1037 as set forth in detail in the Malthaner et al. patent.

2.06 *Exercise of the call-back feature by station S1*

We shall assume that the subscriber at station S1 has been instructed that when it is desired to exercise the call-back feature, the dialed address code should be preceded by the dialed digit "1." We shall further assume that the subscriber has been instructed that there has been assigned a plurality of address locations in the memory, each operable to record a calling directory number. It is, of course, obvious that the number of such address locations may be flexible as determined by the requirements of the special service station. In the instant embodiment we shall assume that address locations 30 through 38 have been preassigned for the storage of call-back directory numbers.

Referring to FIG. 3, upon the off-hook condition of station S1, a continuous loop exists via the T and R leads from station S1 through no-answer detection circuit 3 via released break contacts 3TR–2 and 3TR–3, respectively, to the S1 regular appearance on line link frame 4.

Referring now to FIG. 12, in response to the off-hook condition of station S1, a dial tone connection is established through to a register, such as originating register 8, as set forth in detail in the A. J. Busch patent. When register 8 is connected, relay 12ONC operates as hereinbefore set forth. As further described earlier, each line appearance is assigned a specific class of service. For purpose of the embodiment, we shall assume that the station S1 appearance is assigned class of service 15. Accordingly, at this time relay 12CS operates by an obvious circuit extended through enabled make contacts CU5–1 and CT1–1.

The T and R leads from the station S1 regular appearance is extended through released break contacts 12W–1 and 12W–2 to pulse counting circuit 801 (FIG. 8) as set forth in detail in the A. J. Busch patent. Upon the dialing of the digit "1," the contact configuration manifested by the reception of this digit is advantageously employed to extend ground through pulse counting circuit 801, digit steering circuit 802, and enabled make contact 12CS–2 so as to operate relay 8PR. Relay 8PR thereupon locks operated by an obvious circuit. The enabling of relay 8PR thereby provides an indication to register circuit 8 that station S1 desires to exercise the call-back read function at this time.

Figure 8:
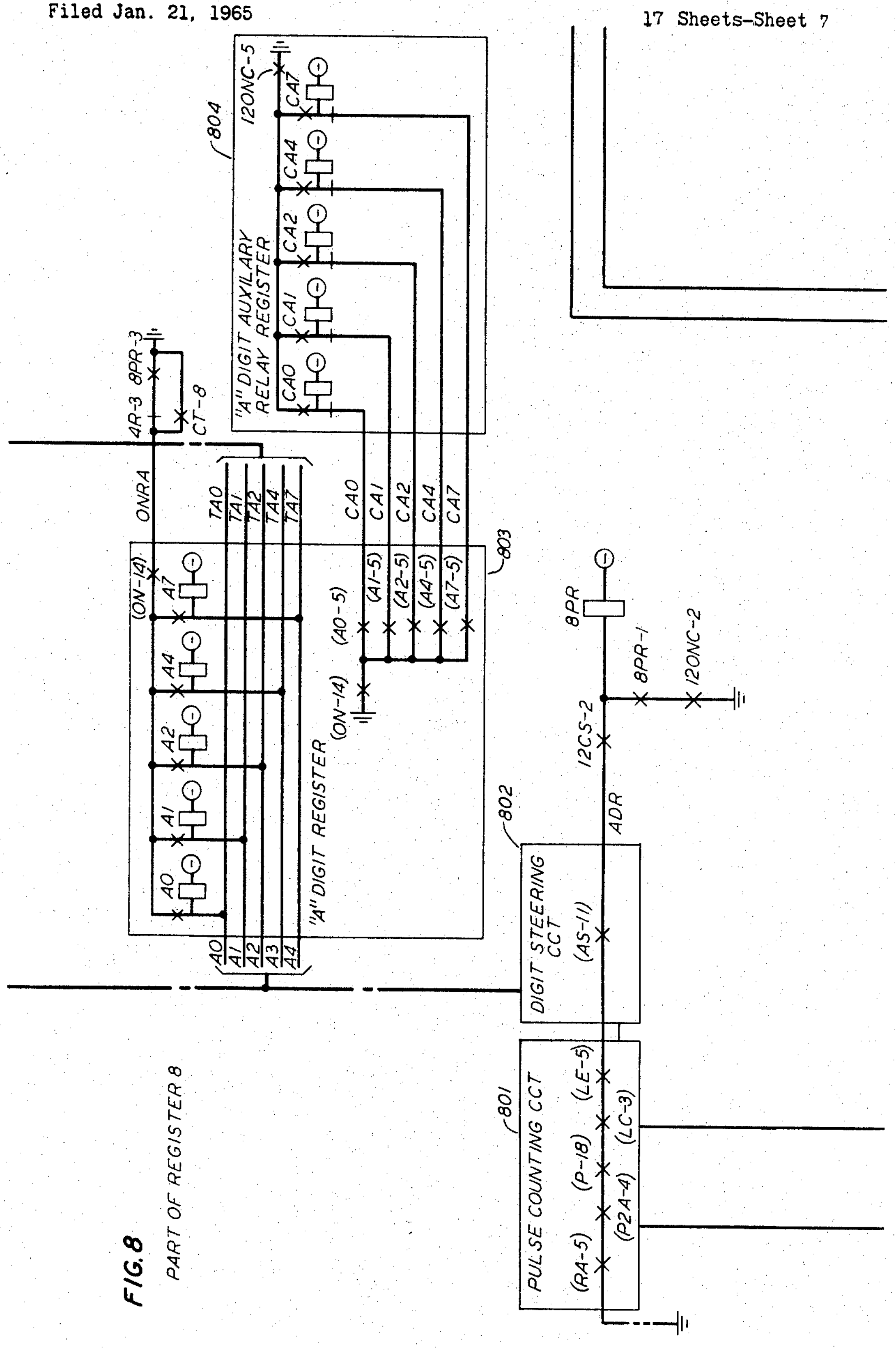

After dialing the alerting code digit "1," the customer dials the appropriate address code which we shall assume to be the digits 30. These digits are registered in the A and B digit registers 803 and 401, respectively (FIG. 8 and FIG. 4). As set forth in detail in the Busch disclosure, the corresponding A0–A7 and B0–B7 relays operate in originating register 8. A and B digit auxiliary registers 804 and 404, which are arranged as shown in FIGS. 8 and 4, respectively, respond to ground present on the CA0–CA7 and CB0–CB7 leads to thereby also register the two digit address code dialed by station S1. The successive operation of two of the CA0–CA7 and two of the CB0–CB7 relays completes the operate path of relay 4R which extends from battery through the winding of relay 4R, through check circuits 405 and 406, operated make contacts 8PR–2, via lead DC, through a chain of released break contacts on the C0–C7 relays in C digit register 402 to ground on operated make contact ON–15. Relay 4R thereupon locks operated by an obvious circuit.

The A and B digit registers 803 and 401 are restored to normal by the operation of break contacts 4R–2 and 4R–3, respectively, which remove the register relays locking ground provided via leads ONRA and ONRB. Digit registers 803 and 401 through 403 are thus available to register the directory number which will be read out of the memory equipment as will be more apparent from the following description.

As described in detail in the Malthaner et al. patent, repertory translation consultor 915, when activated, utilizes the registered address code and equipment location information to cause the reading from the memory of the corresponding directory number. At this point, as shown on FIGS. 4 and 8 and described earlier, digit registers 404 and 804 have recorded the dialed address code. The corresponding CA0–CA7 and CB0–CB7 make contacts are thus enabled in FIG. 9 in preparation to provide this information to repertory translation consultor 915.

The Busch patent discloses in detail the registration of the calling line equipment information in originating register 8. As shown on FIG. 16, the corresponding FTO–6 and VFO–6 make contacts (typical) are therefore enabled preparatory to providing the calling line identity information to repertory translation consultor 915 by placing a negative potential on the associated leads.

Figure 9:
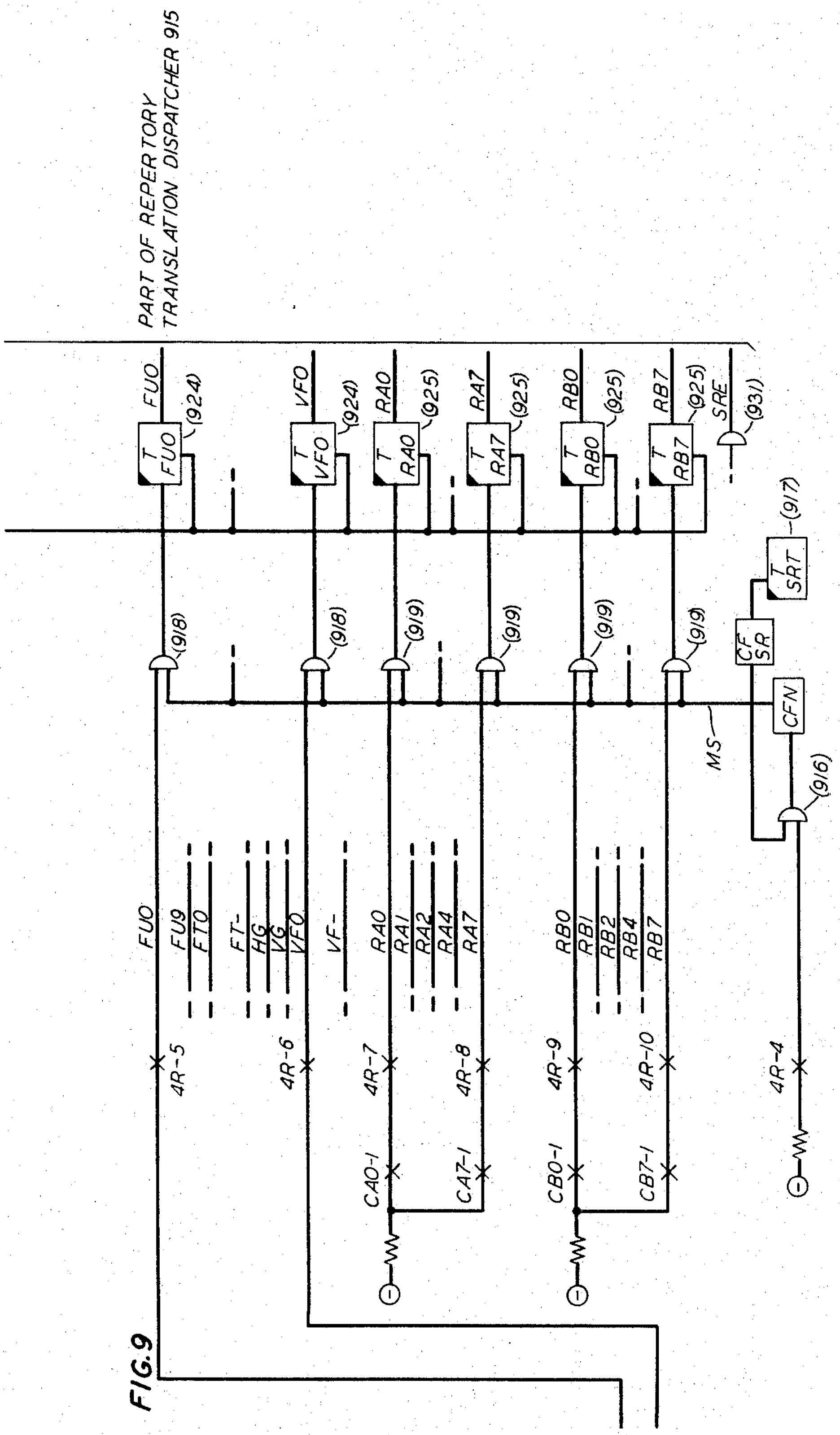

Thus, upon the operation of relay 4R as hereinbefore described, make contacts 4R–5 through 4R–10 are enabled in FIG. 9 to partially enable AND gates 918 and 919 in repertory translation consultor 915. The negative potential provided on lead SRT via operated make contact 4R–4 in conjunction with the normal state of toggle 917 enables AND gate 916 as set forth in detail in the Malthaner et al. patent. The consequent negative signal pulse applied to lead MS enables AND gates 918 and 919 so as to cause the registration of the line equipment information and address code in toggles 924 and 925, respectively.

Figure 6:
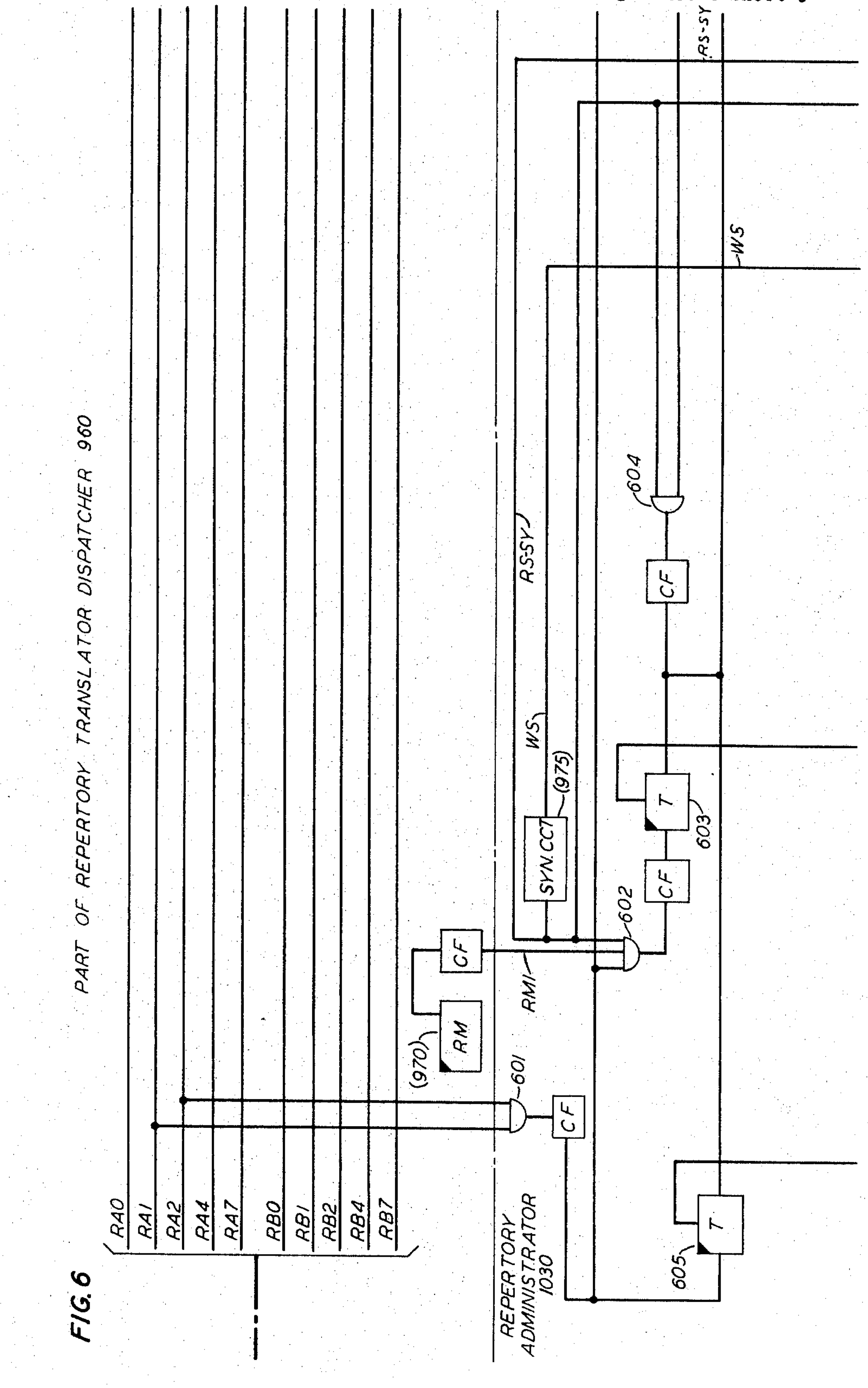
Figure 7:
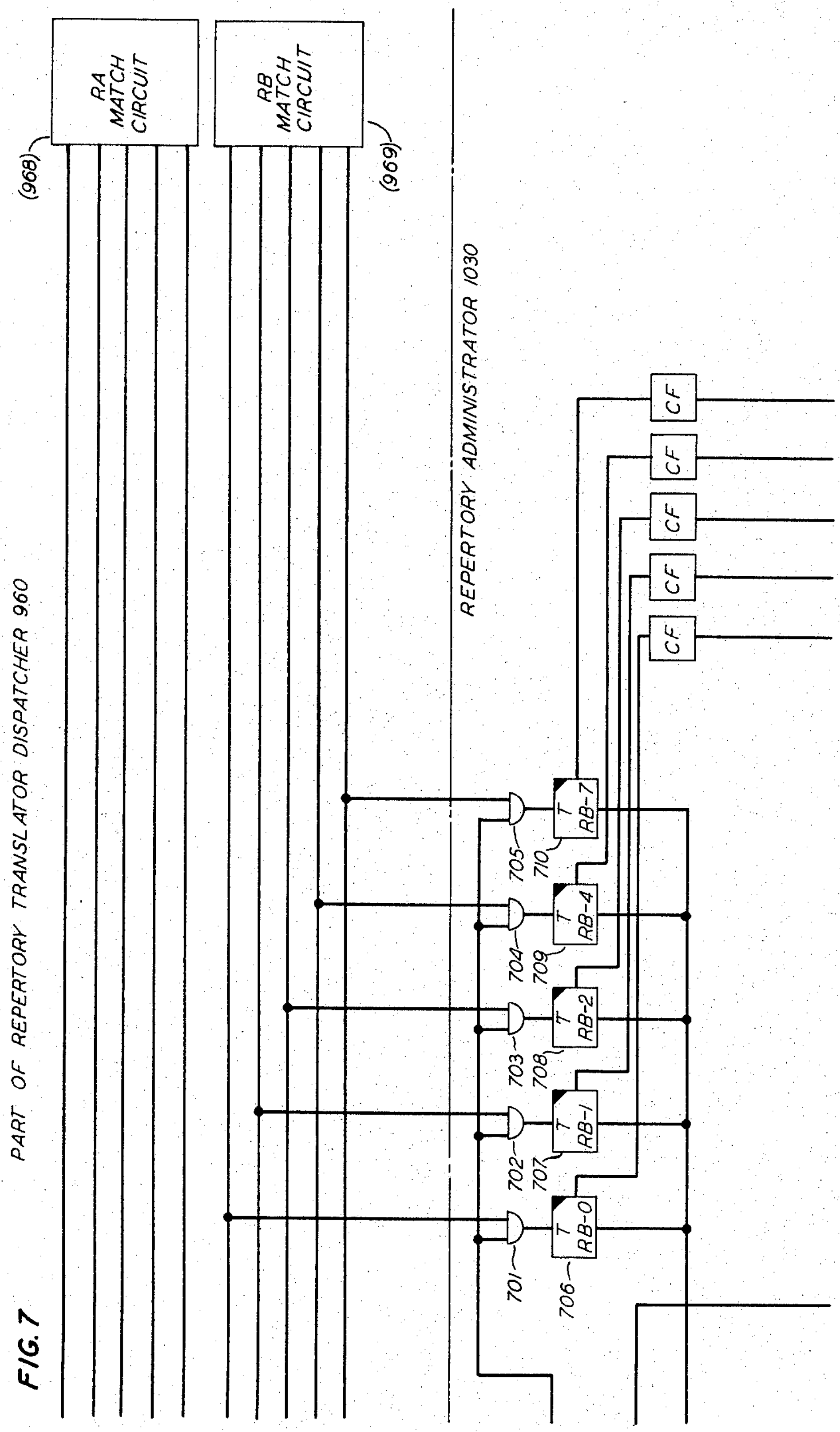

As further described in the Malthaner et al. patent, the subsequent enabling of AND gate 931 in response to the registration of this information applies a positive signal voltage over the SRE lead which enables lockout connector 955 to establish a connection between repertory translation consultor 915 and repertory translation dispatcher 960 (FIG. 6). When this connection is established, the line equipment number and address code recorded in toggles 924 and 925 of FIG. 9, respectively, are dispatched to repertory translation dispatcher 960.

As set forth in the Malthaner et al. patent, when the line equipment number of a calling customer's line and a repertory code dialed by the calling customer are dispatched to repertory translation dispatcher 960, the line equipment number received from the repertory translation consultor 915 is matched with the successive line equipment numbers recorded on repertory drum 30 so as to locate the calling customer's individual repertory area. When a line equipment match is obtained, repertory translation dispatcher 960 then matches the address code dialed by the calling customer and received from repertory translation consultor 915 with the address codes recorded on repertory drum 30 within the calling customer's individual repertory area. When a match is obtained, repertory translation dispatcher 960 reads out the directory number recorded in the slot and dispatches this number via lockout connector 955 to repertory translation consultor 915. The called office code portion of this number is thus recorded in toggles 933, shown in FIG. 5, and the number portion of this directory number is recorded in the thousands, hundreds, tens, and units toggles 934.

Therefore, at this point repertory translation consultor 915 has forwarded the address code in conjunction with the line equipment information and has received in return the directory number corresponding to that specific code.

Referring to FIG. 5, as disclosed in the Malthaner et al. patent, the output of toggles 933 and 934 partially enable AND gates 949 and 950, respectively. The subsequent operation of RM monopulser 935, as set forth in the Malthaner patent is advantageously arranged such that the negative signal output on lead RM enables flip-flop 50 to thereby operate relay 5CT. Relay 5CT thereupon locks operated by an obvious circuit. The negative signal output on lead RM is also advantageously arranged such that, when applied through an inverter such as inverter 960, it enables those AND gates 949 and 950, which are associated with previously operated toggles 933 and 934 as hereinbefore described. The enabling of AND gates 949 and 950 enable the corresponding flip-flops 51–54 so as to provide ground potential on the associated TA 0–7 through TG 0–7 leads, which extend to register 8 via operated contacts on relay 5CT, to the A through G digit registers of FIGS. 4 and 8. The appropriate A0–A7 through G0–G7 registration relays are thus operated in originating register 8 to record the directory number corresponding to the dialed address code. These relays lock operated by an obvious circuit from ground present on the associated ONRA through ONRG leads.

As disclosed in the Malthaner et al. patent, after a predetermined interval, a pulse is provided on the RS-SY lead of FIG. 5 in order to reset the previously operated toggles and thereby restore repertory translation consultor 915 to normal. As shown in FIG. 5, this lead is also extended to reset flip-flop 50 through 54.

Thus, at this point, originating register 8 has received the prior calling station's directory number corresponding to the address code 30. The read function is therefore completed, and the originating register causes the completion of the call as disclosed in detail in the Busch patent. The subsequent release of originating register 8 in the course of completing this call restores relay (ON) to normal thus releasing relay 12ONC. Originating register 8 is thereupon available to serve other originating connections as hereinbefore set forth.

2.07 *Recording the most recently interrogated address location in repertory drum 30*

This section will describe the manner in which the most recently interrogated address code is recorded in repertory drum 30 for subsequent use when the memory equipment receives an erase signal. When repertory translation dispatcher 960 (FIG. 6) is selected, as set forth in the immediately preceding section, the signal present on the RA1 and RA2 leads from lockout connector 955 enable AND gate 601 in repertory administrator 1030 which thereupon applies a signal through an associated cathode follower to lockout connector 1025 to prevent the concurrent selection of repertory administrator 1030 at this time. The output signal from this cathode follower is also provided to enable the left input terminal of AND gate 602. As set forth in detail in the Malthaner et al. patent, RM toggle 970 is enabled in repertory translation dispatcher 960 when the address location code dialed by station S1 is located in repertory drum 30. In the instant arrangement the output of RM toggle 970 is provided as an input signal via lead RM1 to the middle terminal of AND gate 602 in repertory administrator 1030. Upon the occurrence of a pulse on the RS-SY lead from sync circuit 975 AND gate 602 is enabled and the output is applied through a cathode follower to enable toggle 603.

The output from the cathode follower associated with the previously enabled AND gate 601 is also extended to provide an input signal to each of the AND gates 701 through 705 so as to enable each of these AND gates which have a concurrent signal present on them extended from the RB0 through RB7 leads in repertory translation dispatcher 960. Thus, at this time the toggles RB4 and RB7 are enabled since we have assumed that station S1 has dialed the address code 30.

The output of enabled toggle 603 is applied through cathode followers 1001 through 1004 so as to provide an input signal on leads RA1, RA2 to match circuit 1034; and to the RB2 and RB7 leads to match circuit 1035 in repertory administrator 1030. Concurrently therewith the output of cathode followers 1005 is provided as an input to the lower terminal of AND gate 1006 at this time. As described in detail in the Malthaner et al. patent, an output signal is provided by match circuits 1034 and 1035 when it has been determined that the writing heads are over the address location manifested by the address code registered in the RA and RB match circuits.

Since the address code currently registered therein at this time comprises the digits 3 and 9, respectively, an output signal is not provided until the writing heads are located over slot 39 in repertory drum 30. When this occurs the upper and middle input leads to AND gate 1006 are activated thereby enabling AND gate 1006. The output of AND gate 1006 enables toggle 1007 to thereby indicate that the writing heads are now within the address location in which the priorly interrogated address code should be written. The output of toggle 1007 partially enables AND gate 1008. Upon the occurrence of a write sync pulse on the WS lead from sync circuit 975, AND gate 1008 is enabled. As shown on FIG. 11, the output of AND gate 1008 is applied through a cathode follower to a plurality of AND gates 1111 through 1116. Each of these AND gates, which are associated with operated toggles 706 through 710, are thus enabled. Accordingly, since we have assumed the B digit of the most recently interrogated address location to be zero, the AND gates associated with toggles 709 and 710 are enabled at this time.

The output of cathode followers 1003 and 1004 are provided as an input to AND gates associated with the writing of the digits RA1 and RA2. Therefore, at this time the write amplifiers associated with digits RA1, RA2, RB4 and RB7 are enabled and a mark is written in the respectively designated cell in slot 39 in repertory drum 30.

Upon the subsequent generation of a pulse on the RS-SY lead from sync circuit 975 FIG. 6, AND gate 604 is enabled by virtue of the presence of a prior input signal on the lower input terminal of this AND gate applied by the cathode follower associated with AND gate 1008. The enabling of AND gate 604 applies a signal through an associated cathode follower to reset toggles 603, 605, and 706 through 710. Accordingly, repertory administrator 1030 returns to normal having recorded in slot 39 the address location most recently interrogated by station S1.

2.08 *Memory Erase Function*

As described in preceding sections, when the privileged station S1 dials the address code 30, the prior calling line directory number information is returned to register 8 and a connection is completed to a location determined by the directory number information. It is, of course, obvious that an erase function could occur simultaneously with the reading of the information from repertory drum 30 by circuit action of a positive nature, or by arranging the memory for destructive read out as well known in the art. However, since the subscriber at station S1 is unware of the directory number location to which the call will be completed, in the event of such erasure were the call not to succeed, it would be impossible to repeat the connection.

In the embodiment, each of the trunks with which the station S1 will be connected in the course of completing a call-back connection is advantageously arranged, as well known in the art, to return a reverse battery signal only in the event of an answer by the called party.

Referring now to FIGS. 2 and 3, in the event that a call-back connection is successful as manifested by answer of the called station, the reversal of the polarity of the potential applied to the T and R conductors of the regular appearance enable polar relay 3L. The consequent enabling of make contact 3L–1 applies a bridge through coil 207 across the T and R conductors of auxiliary appearance B. It is, of course, obvious in the event that the call is not completed, relay 3L does not operate and accordingly the bridge is not inserted across auxiliary appearance B.

Proceeding now with the description, we shall assume that the call-back connection is completed and relay 3L operates as a result thereof thereby inserting a bridge across auxiliary appearance B. Circuit action proceeds exactly as set forth in section 2.03 with the distinction, of course, that no digits are dialed at this time. Thus, referring now to FIG. 17, the operated condition of make contacts S–6 and A–6 as hereinbefore set forth extends battery potential to timing circuit 1701. Timing circuit 1701 may comprise a number of configurations well known in the art such that in response to an input signal maintained for a predetermined interval of time an output signal is provided sufficient to enable TM toggle 1702. In the instant case the continuously enabled state of contacts S–6 and A–6 causes toggle 1702 to be enabled thereby extending a signal through an associated cathode follower to gate 1703. Gate 1703 comprises any one of a number of configurations well known in the art such that in its normal disabled state continuity exists between terminals 1 and 2, and when enabled such continuity does not exist between terminals 1 and 2. Accordingly, the negative battery present on the RB4 lead from register 8 is extended via terminal 1 of gate 1703 to terminal 3 so as to enable toggle RB2 (FIG. 13) at this time. Circuit action thereupon continues exactly as set forth in section 2.03 with the distinction of course that the address code now forwarded to repertory administrator 1030 comprises the digits 39.

Figure 10:
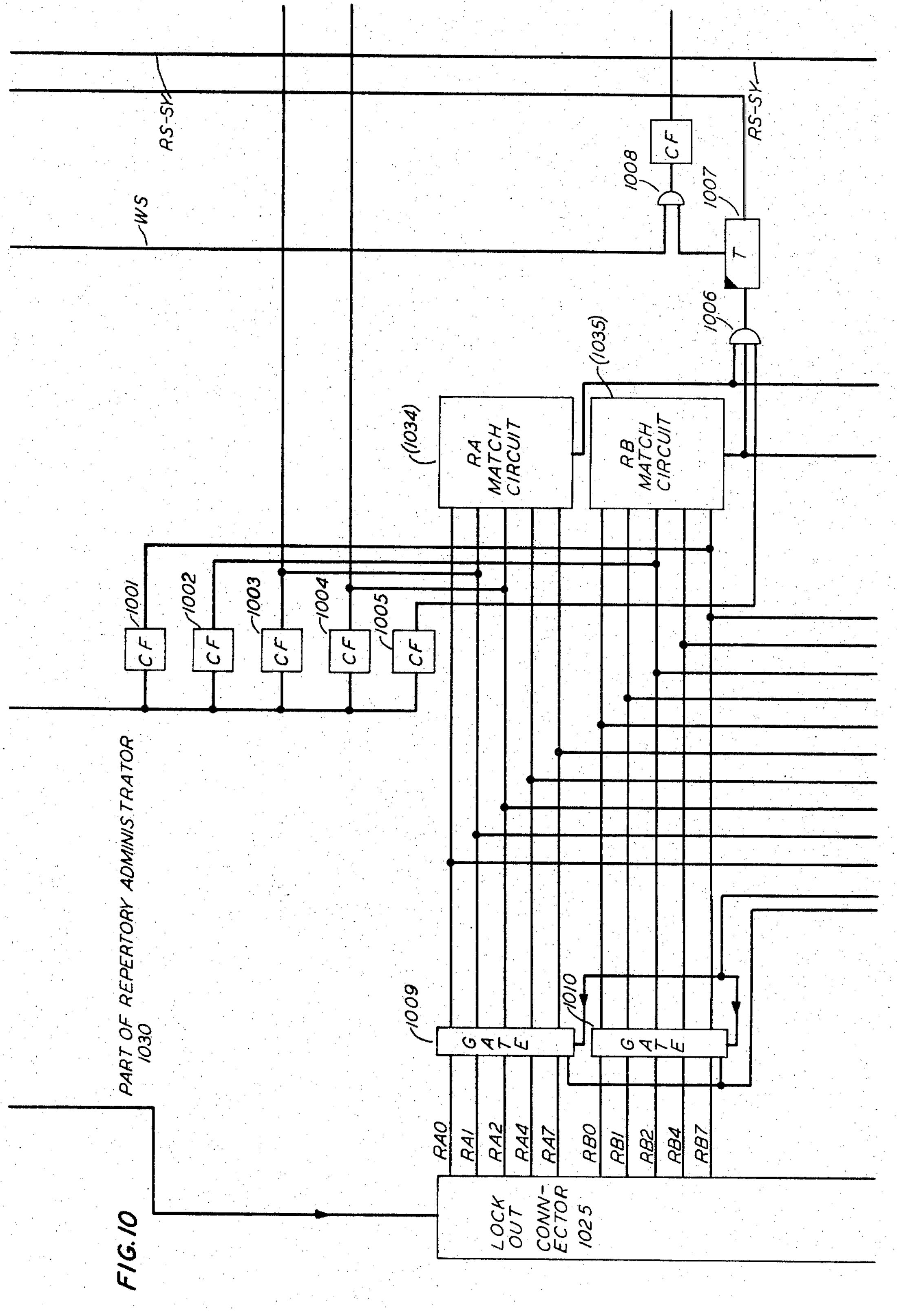
Figure 14:
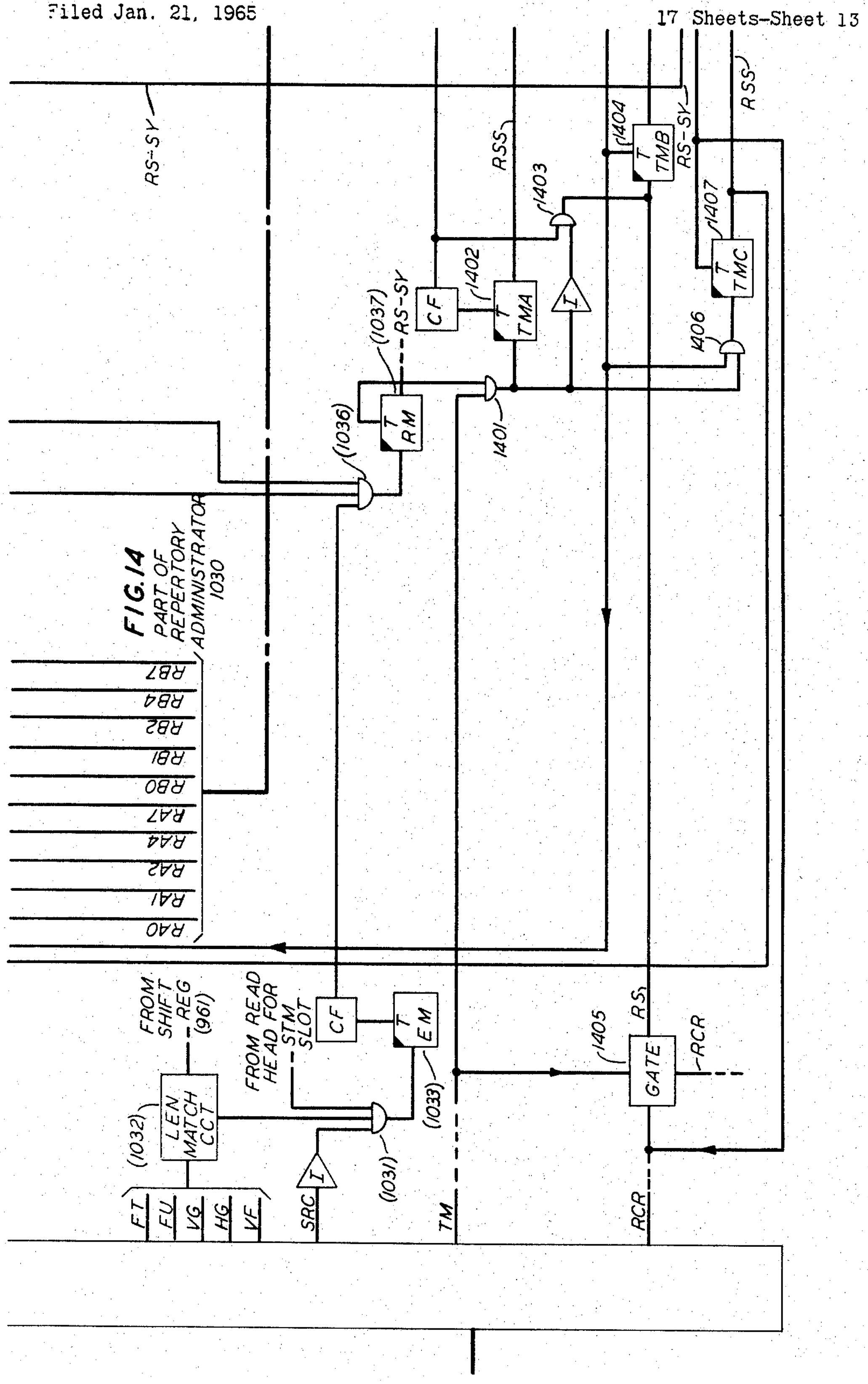
Figure 15:
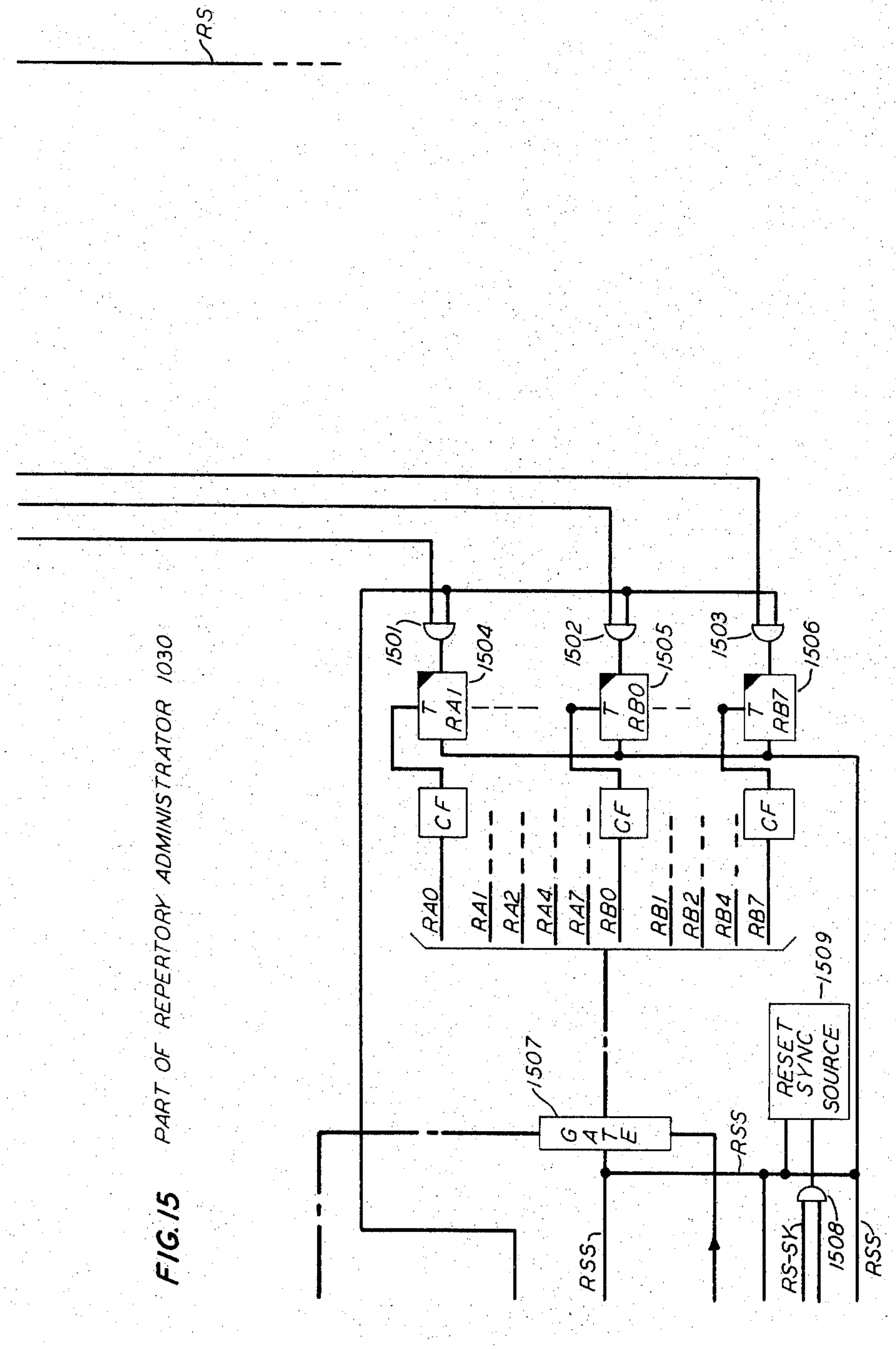

Referring now to FIG. 10, upon the aforedescribed selection of repertory administrator 1030, the digit 3 is recorded in RA match circuit 1034. The digit 9 is recorded in RB match circuit 1035. Concurrently therewith a signal is applied over the TM lead from toggle 1702 in register 8 to enable inhibiting gate 1405 and to partially enable AND gate 1401 in repertory administrator 1030. As described in detail in the Malthaner et al. patent, repertory administrator 1030 proceeds to locate the specific area assigned to station S1, and when this area has been located causes the enabling of EM toggle 1033 (FIG. 14). The output of toggle 1033 is provided as an input to AND gate 1036 such that upon the concurrence of signals from the RA and RB match circuits AND gate 1036 is enabled. AND gate 1036, in turn, operates toggle 1037.

An output signal from toggle 1037 in conjunction with the signal present on lead TM, enables AND gate 1401, Accordingly TMA toggle 1402 is enabled at this time and provides an output signal through a cathode follower to each of AND gates 1501 through 1503.

Figure 11:
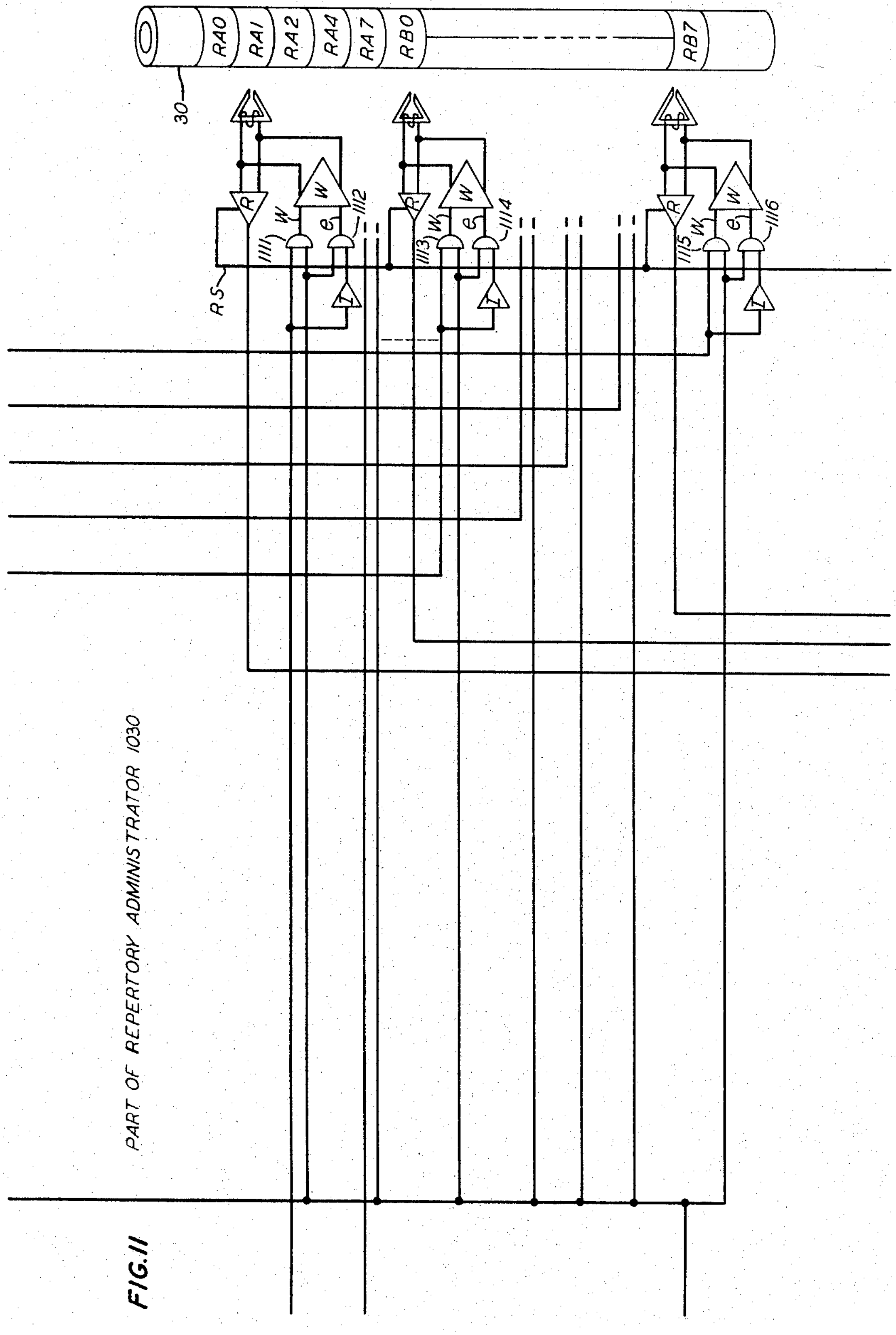

Referring now to FIG. 11, as set forth in the Malthaner patent, upon the occurrence of a sync pulse on the RS lead, the read amplifiers, which are currently located over slot 39, are enabled thereby enabling the associated AND gates 1501 through 1503. Accordingly, the appropriately designated toggles 1504 through 1506 are operated to thereby record the identity of the most recently interrogated address location in the station S1 area in repertory drum 30.

Referring now to FIG. 14, the enabled condition of toggle 1402 also applies a signal through the associated cathode follower to the upper terminal of AND gate 1403 which is ineffective at this time to enable AND gate 1403 because of the disabling potential present on the lower terminal which is extended through an inverter from enabled AND gate 1401. Upon the subsequent resetting of toggle 1037 by virtue of the reset pulse extending on the RS-SY lead, AND gate 1401 is restored to normal thereby enabling AND gate 1403 which, in turn, enables TMB toggle 1404 to record the fact that RM toggle 1037 has been operated and reset.

The output of TMB toggle 1404 is extended to gate 1507 which, when enabled, extends the output of toggles 1504 through 1506 to the correspondingly designated leads in match circuits 1034 and 1035 in FIG. 10. Concurrently therewith the output of TMB toggle 1404 is also applied to inhibiting gates 1009 and 1010 so as to remove the enabling potentials priorly provided on the address code indicating leads from lockout connector 1025.

Thus, the information read out of slot 39, namely, the address code 30, is now recorded in the RA and RB match circuits of FIG. 10. It will also be noted that by virtue of the priorly described enabling of inhibited gate 1405, a reset signal is not provided on the RCR lead to release the associated repertory change register trunk 22 at this time. Thus, as the repertory drum continues rotating, repertory administrator 1030 attempts to locate slot 30 in the repertory area assigned to station S1. When this particular slot is located, as hereinbefore described, RM toggle 1037 is again enabled and, as shown on FIG. 18, provides an input to the upper terminal of AND gate 1801 which is associated with the erase lead of the associated write amplifier. The concurrent presence of a signal on the TM lead from lockout connector 1025 permits the enabling of AND gate 1801 when sync circuit 975 generates a pulse on lead WS. Thus, at this time the output of AND gate 1801 is applied via the erase lead to the associated write amplifier to cause the erasure of the mark priorly written in the SB channel in slot 30, thereby rendering this slot available for the subsequent storage of another calling line directory number.

Returning again to FIG. 14, the subsequent enabling of RM toggle 1037 in conjunction with the operated state of TM toggle 1404 enables AND gate 1406 at this time. The enabling of AND gate 1406 operates TMC toggle 1407 which thereupon provides an output on the RCR lead so as to restore the connected repertory change register trunk 22 and register 8 to normal as hereinbefore described. The output of TMC toggle 1407 is also provided as an input to AND gate 1508 such that upon the subsequent enabling of the RS–SY lead by sync circuit 975 AND gate 1508 is enabled to, in turn, enable reset sync source 1509 which thereupon provides a momentary reset pulse via the RSS lead to restore all gates and toggles to normal. Accordingly, repertory administrator 1030 is restored to normal so as to be available for subsequent use in connection with other calls.

2.09 *Subscriber activated erase function*

After repeated unsuccessful attempts to reach a prior calling party by the dialing of one of the predetermined address codes, the subscriber station S1 may decide to cancel the storage of the directory number information associated with this particular party.

As set forth in the preceding sections, each of the trunks associated with the call-back connection is arranged to return reverse battery supervision to thereby generate an erase function upon answer by a called station. The subscriber may thus cause the erasure of the information priorly stored for a particular directory number by dialing the address code associated therewith. Upon an unsuccessful attempt to reach the calling party, the subscriber then abandons the connection and dials a 11X service code operable to cause selection of a trunk as set forth in the Busch patent. The selected trunk (such as trunk 11, FIG. 1) is arranged to return a reverse battery signal. Accordingly, polar relay 3L operates as hereinbefore described so as to generate an erase signal associated with the most recently interrogated address location.

3. *Summary*

While the equipment of this invention has been described with reference to a particular embodiment wherein a switching system arranged with subscriber controlled memory equipment is enabled to permit storage of a plurality of calling line directory numbers for subsequent call-back completion by the dialing of a respective plurality of address codes by the called station, it is to be understood that such an embodiment is intended to be illustrative of the principles of the invention and that numerous other arrangements may be devised by those skilled in the art without departing from the spirit and scope of the invention.

For example, the invention may be used in a data processing system wherein a central data processing machine is selectable at arbitrary intervals by a plurality of subordinate data processing machines.

A further example would be the use of the invention in an arrangement wherein the calling station is permitted to record a directory number in the event of an overflow equipment condition which prevents a completed connection to the called party.

Another example would be the use of the invention in a system wherein the calling lines are automatically identified to the memory equipment without requiring action on the part of the calling station.

Another example would be the use of the invention in a system wherein the auxiliary appearance is utilized to serve a plurality of special service stations in the event of a busy condition of any of such stations.

Another example would be the use of the invention in a system wherein the special service line is provided with a lamp automatically lighted in response to a no-answer condition of such station.

Another example would be the use of the invention in a system wherein automatic completion to the regular appearance of the special service station is provided if the special service station should become available during the interval when information is being stored in the memory by a calling station.

What is claimed is:

1. In a telephone system:
- a plurality of station,
- means controlled by each of said stations for directing calling connections to others of said stations,
- common memory means responsive to the unavailability of a called station for storing the identity of any one of said plurality of stations, and
- means responsive to the reception of a predetermined code from said called station and controlled by said memory means for enabling said directing means to direct a calling connection from said called station to said one station.

2. In a telephone system the combination set forth in claim 1 wherein said memory means further comprises means for concurrently storing the respective identities of other stations.

3. In a telephone system the combination set forth in claim 2 further comprising means responsive to the reception of each one of a plurality of other predetermined codes from said called station for enabling said directing means to direct respective calling connections exclusively to each of said other stations.

4. In a telephone system the combination set forth in claim 3 further comprising means operative in response to completion of each of said calling connections from said called station for erasing the respectively stored identities of said stations.

5. In a switching system:
- a calling station and a called station each assigned a distinct designation,
- control means for completing a connection between said stations in response to the reception of one of said designations,
- means for detecting a busy condition of the called station,
- memory means operative in response to the enabling of said busy condition detecting means for registering the designation of the calling station, and
- means responsive to the subsequent reception of a predetermined code from said called station for forwarding said registered designation to said control means.

6. In a switching system:
- a calling station and a called station each assigned a distinct designation,
- control means for completing a connection between said stations in response to the reception of one of said designations,
- means for detecting a no-answer condition of the called stations,
- memory means operative in response to the enabling of said no-answer detection means for registering the identity of the calling station, and
- means responsive to the subsequent reception of a predetermined code from said called station for forwarding said registered designation to said control means.

7. In a telephone system, a plurality of lines including special service lines each assigned a distinct designation:
- control means for completing connections between calling and called ones of said lines,
- busy line indicating means controlled by said control means operable in response to a busy line condition of a called special service line,
- no-answer indicating means controlled by said control means operable in response to a no-answer condition of said called special service line,
- memory means enabled by each said operation of said busy line indicating means and each said operation of said no-answer indicating means for storing the designation of the respective calling lines, and
- means responsive to the reception of each one of a plurality of codes from said special service line for enabling said control means to complete a connection from said special service line to each one of said respective calling lines.

8. In a switching system a plurality of stations each comprising selectively operable signaling means:
- a memory operable to store a plurality of calling station directory numbers each in response to signals from each said station,
- a switching network comprising input and output appearances and including at least one regular input appearance per station,
- a special service station provided with an additional input appearance,
- control means for directing respective calling connections from each one of said plurality of stations via said switching network to said special service station,
means responsive to the unavailability of said special service station via said regular appearance for completing said respective calling connections to said additional input appearance, and means responsve to each completion of a calling connecting to said additional input appearance for enabling said memory means.

9. The combination set forth in claim 8 further comprising announcement means connectable to said additional input appearance and operable in response to the enabling of said memory means for informing said connected calling station to signal a calling directory number.

10. The combination set forth in claim 8 wherein said memory means comprises register means provided with an output appearance on said network:
writing means for enabling the writing of information in said memory,
reading means for enabling the reading of information from said memory, and
means responsive to the establishment of a connection from said additional input appearance to said register means for enabling said writing means.

11. The combination set forth in claim 10 further comprising means responsive to an off-hook signal from said special service station for completing a dial tone connection between said special service station regular appearance and said register means:
means responsive to the establishment of said dial tone connection and the reception of an alerting signal from said special service line for registering further signals from said special service station, and
said control means comprising means responsive to the reception of said further signals for enabling said reading means.

12. The combination set forth in claim 11 further comprising means responsive to the enabling of said reading means and controlled by said further signals for transmitting stored directory number information to said register means:
said register comprising means for recording said transmitted information, and
means controlled by said recorded information for completing a calling connection from said special service station.

13. In a switching system:
a switching network,
a plurality of lines each provided with one regular input appearance on said network,
a special service line provided with an additional appearance on said network,
memory means,
means responsive to the enabling of said additional appearance for completing a connection from said additional appearance to said memory means via said network,
timing means enabled by said memory means,
means operative in response to signals from said additional appearance for inhibiting said timing means and for storing information in said memory means, and
means responsive to the subsequent enabling of said completing means and said timing means for erasing said stored information.

14. In a switching system:
the combination set forth in claim 13 further comprising a station connected to said special service line, and
means responsive to the unavailability of said station via said regular appearance for connecting a calling one of said plurality of lines to said additional appearance.

15. In a switching system:
the combination set forth in claim 14 further comprising means at said station for enabling said completing means to complete a connection from said regular appearance to said memory means,
means responsive to the completion of said connection and the subsequent transmission of signals by said station for retrieving said stored information,
means for releasing said memory means, and
means controlled by said retrieved information for directing a calling connection from said regular appearance to said calling line.

16. In a switching system:
the combination set forth in claim 15 further comprising means responsive to the completion of said calling connection for re-enabling said additional appearance.

17. In a switching system:
a called station,
a plurality of calling stations,
a register,
means for establishing exclusive connections between each of said calling stations and said register in lieu of exclusive connections between each of said calling stations and said called station,
a memory comprising a plurality of address locations assigned to said called station,
means in said register for recording a block of information transmitted by each of said calling stations,
means for affixing a predetermined one of said address locations to each of said blocks of information, and
means responsive to the reception of each of said blocks of information and controlled by said affixed address location for writing said information in one of said assigned locations in said memory.

18. In a switching system:
the combination set forth in claim 17 further comprising means controlled by the reception of said affixed address code and responsive to the presence of written information in any of said assigned address locations for writing subsequent information in a succeeding address location.

19. In a switching system:
the combination set forth in claim 18 further comprising means controlled by said called station for transmitting to said memory the identity of an arbitrary one of said assigned address locations,
means responsive to the reception of said one address location identity from said called station for reading out of said memory the information stored in the corresponding address location, and
means controlled by said stored information for completing a call-back connection from said called station to a station identified by said information.

20. In a switching system:
the combination set forth in claim 19 further comprising means responsive to the enabling of said reading means for storing said arbitrary address location information in said memory,
means responsive to the completion of said call-back connection for reading out said arbitrary address location information, and
means controlled by said arbitrary address location information for erasing the information stored in said arbitrary address location.

References Cited

UNITED STATES PATENTS

| | | | |
|---|---|---|---|
| 2,479,252 | 8/1949 | Pond | 179—5.5 |
| 2,951,908 | 9/1960 | Malthaner | 179—18 |
| 3,214,523 | 10/1965 | Hess | 179—18 |

KATHLEEN H. CLAFFY, *Primary Examiner.*
A. H. GESS, *Assistant Examiner.*